(12) United States Patent
Tabata et al.

(10) Patent No.: US 11,548,371 B2
(45) Date of Patent: Jan. 10, 2023

(54) VEHICLE DRIVE SYSTEM AND CONTROL METHOD THEREFOR

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Koji Takaira, Okazaki (JP); Akinori Homan, Toyota (JP); Yosuke Akiyama, Susono (JP); Akira Ijichi, Odawara (JP); Kunihiko Usui, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/548,294

(22) Filed: Dec. 10, 2021

(65) Prior Publication Data
US 2022/0281309 A1 Sep. 8, 2022

(30) Foreign Application Priority Data
Mar. 2, 2021 (JP) .............................. JP2021-032911

(51) Int. Cl.
*B60K 6/52* (2007.10)
*B60K 6/365* (2007.10)
*B60K 6/387* (2007.10)
*B60K 17/346* (2006.01)

(52) U.S. Cl.
CPC ................ *B60K 6/52* (2013.01); *B60K 6/365* (2013.01); *B60K 6/387* (2013.01); *B60K 17/3462* (2013.01)

(58) Field of Classification Search
None
See application file for complete search history.

(56) References Cited

U.S. PATENT DOCUMENTS 8,371,413 B2 * 2/2013 Hayashi ................... B60K 6/52
180/242
8,888,638 B2 * 11/2014 Mueller ................... B60K 6/48
475/5

FOREIGN PATENT DOCUMENTS

WO 2010/141682 A1 12/2010
WO WO-2013145093 A1 * 10/2013 ............. B60K 17/02
WO WO-2020160865 A1 * 8/2020

* cited by examiner

*Primary Examiner* — Dirk Wright
(74) *Attorney, Agent, or Firm* — Oliff PLC

(57) ABSTRACT

A drive system including first and second power sources, first and second output shafts, a differential mechanism, and an electronic control unit, and a control method therefor are provided. The differential mechanism is configured such that the second power source is connected to a first rotating element, one output shaft of a vehicle is connected to a second rotating element, and the other output shaft of the vehicle is connected to a third rotating element so as to be able to be connected to or disconnected from the third rotating element by a connect-disconnect mechanism, and includes at least one of an engagement element that selectively engages any two of the three rotating elements and an engagement element that selectively engages the third rotating element to a fixing member. The electronic control unit is configured to, during turning, prohibit switching between a first drive mode and a second drive mode.

5 Claims, 25 Drawing Sheets

|  | C1 | C2 | B1 | B2 | F1 |
|---|---|---|---|---|---|
| 1st | ENGAGED |  |  | ENGAGED AS NEEDED | ENGAGED |
| 2nd | ENGAGED |  | ENGAGED | ENGAGED |  |
| 3rd | ENGAGED | ENGAGED |  | ENGAGED |  |
| 4th |  | ENGAGED | ENGAGED |  |  |
| R | ENGAGED |  |  | ENGAGED |  |

FIG. 9

| DRIVE STATE | MODE | BF1 | CF1 | D1 (1) | D1 (2) | D2 (1) | D2 (2) |
|---|---|---|---|---|---|---|---|
| 1 | EV(FF)_Hi | | ENGAGED | ENGAGED | | | |
| 2 | EV(FF)_Lo | ENGAGED | | ENGAGED | | | |
| 3 | H4_TORQUE_SPLIT | | | ENGAGED | | ENGAGED | |
| 4 | H4_LSD | | ENGAGED (ENGAGEMENT CONTROL) | ENGAGED | | ENGAGED | |
| 5 | H4_Lock | | | ENGAGED | | | ENGAGED |
| 6 | L4_Lock | ENGAGED | | | ENGAGED | | ENGAGED |

FIG. 22

| DRIVE STATE | MODE | BF1 | CF1 | D1 (1) | D1 (2) | D2 (1) | D2 (2) |
|---|---|---|---|---|---|---|---|
| 1 | EV(FR)_Hi | | ENGAGED | ENGAGED | | | |
| 2 | EV(FR)_Lo | ENGAGED | | ENGAGED | | | |
| 3 | H4_TORQUE_SPLIT | | ENGAGED (ENGAGEMENT CONTROL) | ENGAGED | | ENGAGED | |
| 4 | H4_LSD | | ENGAGED | ENGAGED | | ENGAGED | |
| 5 | H4_Lock | | | ENGAGED | | | ENGAGED |
| 6 | L4_Lock | ENGAGED | | | ENGAGED | | ENGAGED |

VEHICLE DRIVE SYSTEM AND CONTROL METHOD THEREFOR

CROSS-REFERENCE TO RELATED APPLICATION

This application claims priority to Japanese Patent Application No. 2021-032911 filed on Mar. 2, 2021, incorporated herein by reference in its entirety.

BACKGROUND

1. Technical Field

The disclosure relates to a vehicle drive system and a control method therefor.

2. Description of Related Art

WO 2010/141682 describes a vehicle drive system. The vehicle drive system includes a first power source, a second power source, a first output shaft connected to the first power source and configured to output power to one of a pair of front wheels and a pair of rear wheels, a second output shaft configured to output power to the other one of the pair of front wheels and the pair of rear wheels, and a differential mechanism including a first rotating element, a second rotating element, and a third rotating element. The vehicle drive system is configured to be capable of achieving a first drive mode and a second drive mode. In the first drive mode, a vehicle is caused to run in a four-wheel drive state by using power output from at least the first power source. In the second drive mode, the vehicle is caused to run in a two-wheel drive state by using power output from the second power source.

SUMMARY

It is conceivable that, in the vehicle drive system described in WO 2010/141682, the differential mechanism connects the second power source to the first rotating element, connects one of the first output shaft and the second output shaft to the second rotating element, connects the other one of the first output shaft and the second output shaft to the third rotating element such that the other one of the first output shaft and the second output shaft is able to be connected to or disconnected from the third rotating element by a connect-disconnect mechanism, and at least one of an engagement element configured to selectively engage any two of the first rotating element, the second rotating element, and the third rotating element and an engagement element configured to selectively engage the third rotating element with a fixing member. In this case, when the connect-disconnect mechanism is set to a connected state in which the other one output shaft is connected to the third rotating element, the first drive mode is achieved. When the connect-disconnect mechanism is set to a disconnected state in which the other output shaft is disconnected from the third rotating element and the first rotating element, the second rotating element, and the third rotating element are integrally rotated or the third rotating element is fixed, the second drive mode is achieved. Incidentally, when the drive mode is switched from the first drive mode to the second drive mode or when the drive mode is switched from the second drive mode to the first drive mode, the distribution of driving force between the front wheels and the rear wheels changes between before and after the drive mode is switched. For this reason, when the drive mode is switched from the first drive mode to the second drive mode or switched from the second drive mode to the first drive mode while the vehicle is turning, there could be an influence on the behavior of the vehicle.

The disclosure provides a vehicle drive system and a control method therefor, which are capable of reducing an influence on the behavior of a vehicle resulting from switching of a drive mode when the vehicle is turning.

A first aspect of the disclosure relates to a vehicle drive system including a first power source, a second power source, a first output shaft, a second output shaft, a differential mechanism, and an electronic control unit. The first output shaft is connected to the first power source and is configured to output power to one of a pair of front wheels and a pair of rear wheels of a vehicle. The second output shaft is configured to output power to the other one of the pair of front wheels and the pair of rear wheels. The differential mechanism is a mechanism including a first rotating element, a second rotating element, and a third rotating element. The differential mechanism is configured such that the second power source is connected to the first rotating element, one of the first output shaft and the second output shaft is connected to the second rotating element, and the other one of the first output shaft and the second output shaft is connected to the third rotating element so as to be able to be connected to or disconnected from the third rotating element by a connect-disconnect mechanism. The differential mechanism includes at least one of a first engagement element configured to selectively engage any two of the first rotating element, the second rotating element, and the third rotating element and a second engagement element configured to selectively engage the third rotating element to a fixing member. The electronic control unit is configured to, when a first drive mode in which the vehicle is caused to run in a four-wheel drive state by using power output from at least the first power source is set, set the connect-disconnect mechanism to a connected state in which the other one output shaft is connected to the third rotating element. The electronic control unit is configured to, when a second drive mode in which the vehicle is caused to run in a two-wheel drive state by using power output from the second power source is set, set the connect-disconnect mechanism to a disconnected state in which the other output shaft is disconnected from the third rotating element, and engage the engagement element to integrally rotate the first rotating element, the second rotating element, and the third rotating element or fix the third rotating element to the fixing member. The electronic control unit is configured to, when the vehicle is turning, prohibit at least one of switching of a drive mode from the first drive mode to the second drive mode and switching of the drive mode from the second drive mode to the first drive mode.

With the vehicle drive system according to the first aspect, an influence on the behavior of the vehicle resulting from switching of the drive mode when the vehicle is turning is reduced.

In the vehicle drive system according to the first aspect, the electronic control unit may be configured to, when the vehicle starts turning while switching of the at least one drive mode is being performed, and when a state of progress of the switching of the drive mode has not reached a predetermined state of progress, interrupt the switching of the drive mode and return the drive mode to an original drive mode.

With the thus configured vehicle drive system, even when the vehicle starts turning while switching of the drive mode is being performed, an influence on the behavior of the vehicle resulting from the switching to the drive mode is reduced.

In the thus configured vehicle drive system, the predetermined state of progress may be a state where switching of the connect-disconnect mechanism is complete.

With the thus configured vehicle drive system, it is possible to quickly return to an original drive mode.

In the vehicle drive system according to the first aspect, the electronic control unit may be configured to, when the vehicle is turning at a steering angle and a vehicle speed of the vehicle respectively greater than preset values, prohibit switching of the at least one drive mode.

With the thus configured vehicle drive system, when the vehicle is turning, that is, when the behavior of the vehicle tends to be instable as a result of switching of the drive mode, switching of the drive mode is suppressed.

A second aspect of the disclosure relates to a control method for a vehicle drive system including a first power source, a second power source, a first output shaft, a second output shaft, and a differential mechanism. The first output shaft is connected to the first power source and is configured to output power to one of a pair of front wheels and a pair of rear wheels of a vehicle. The second output shaft is configured to output power to the other one of the pair of front wheels and the pair of rear wheels. The differential mechanism is a mechanism including a first rotating element, a second rotating element, and a third rotating element. The differential mechanism is configured such that the second power source is connected to the first rotating element, one of the first output shaft and the second output shaft is connected to the second rotating element, and the other one of the first output shaft and the second output shaft is connected to the third rotating element so as to be able to be connected to or disconnected from the third rotating element by a connect-disconnect mechanism. The differential mechanism includes at least one of a first engagement element configured to selectively engage any two of the first rotating element, the second rotating element, and the third rotating element and a second engagement element configured to selectively engage the third rotating element to a fixing member. The control method includes the following (i), (ii), and (iii): (i) when a first drive mode in which the vehicle is caused to run in a four-wheel drive state by using power output from at least the first power source is set, setting the connect-disconnect mechanism to a connected state in which the other one output shaft is connected to the third rotating element; (ii) when a second drive mode in which the vehicle is caused to run in a two-wheel drive state by using power output from the second power source is set, setting the connect-disconnect mechanism to a disconnected state in which the other output shaft is disconnected from the third rotating element, and engaging the engagement element to integrally rotate the first rotating element, the second rotating element, and the third rotating element or fixing the third rotating element to the fixing member; and (iii) when the vehicle is turning, prohibiting at least one of switching of a drive mode from the first drive mode to the second drive mode and switching of the drive mode from the second drive mode to the first drive mode.

With the control method for a vehicle drive system according to the second aspect, an influence on the behavior of the vehicle resulting from switching of the drive mode when the vehicle is turning is reduced.

With the vehicle drive system and the control method according to the aspects of the disclosure, it is possible to reduce an influence on the behavior of the vehicle resulting from switching of the drive mode when the vehicle is turning.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is an operation chart showing the relationship between each drive state and each of operation statuses of the engagement devices in the transfer according to the first embodiment;

FIG. 22 is an operation chart showing the relationship between each drive state and each of operation statuses of the engagement devices in the transfer according to the second embodiment;

DETAILED DESCRIPTION OF EMBODIMENTS

First Embodiment

Hereinafter, a first embodiment of a vehicle drive system according to the disclosure will be described. The present embodiment does not limit the disclosure.

Figure 1:
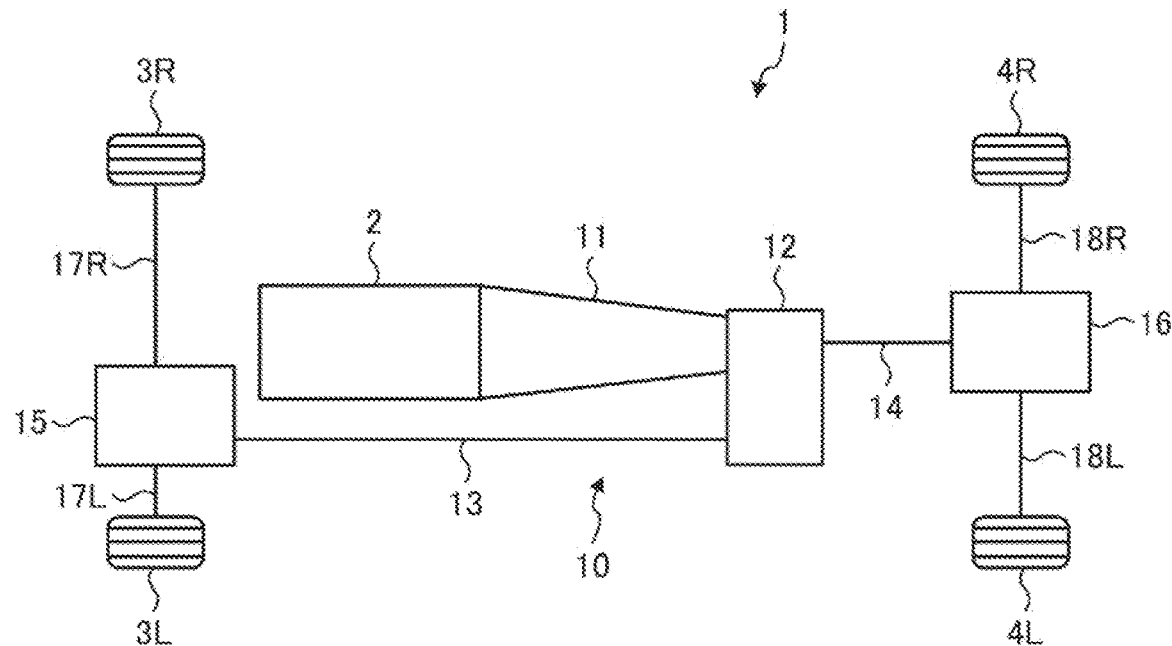
FIG. 1 is a diagram showing the schematic configuration of a vehicle including a drive system according to a first embodiment of the disclosure.

FIG. 1 is a diagram showing the schematic configuration of a vehicle 1 including a drive system 10 according to the first embodiment. The vehicle 1 includes right and left front wheels 3R, 3L, right and left rear wheels 4R, 4L, and the drive system 10. The drive system 10 transmits the power of an engine 2 serving as a first power source to each of the right and left front wheels 3R, 3L and the right and left rear wheels 4R, 4L. The vehicle 1 is a four-wheel-drive vehicle based on front engine rear drive.

The drive system 10 includes the engine 2, a combined transmission 11 coupled to the engine 2, a transfer 12 that is a front and rear driving force distribution device coupled to the combined transmission 11, a front propeller shaft 13 and a rear propeller shaft 14 each coupled to the transfer 12, a front wheel differential gear mechanism 15 coupled to the front propeller shaft 13, a rear wheel differential gear mechanism 16 coupled to the rear propeller shaft 14, right and left front wheel axles 17R, 17L coupled to the front wheel differential gear mechanism 15, and right and left rear wheel axles 18R, 18L coupled to the rear wheel differential gear mechanism 16. When the right and left wheels or right and left axles are not distinguished from each other, the suffixes R and L are omitted, and the wheels or axles are referred to as front wheels 3, rear wheels 4, front wheel axles 17, and rear wheel axles 18.

The engine 2 is, for example, a known internal combustion engine, such as a gasoline engine and a diesel engine. An engine torque of the engine 2, which is an output torque of the engine 2, is controlled by an electronic control unit 100 (described later) controlling an engine controller 101 such as a throttle actuator, a fuel injection device, and an ignition device provided in the engine 2.

Power output from the engine 2 is transmitted to the transfer 12 via the combined transmission 11. Power transmitted to the transfer 12 is transmitted from the transfer 12 to the rear wheels 4 sequentially via a rear wheel-side driveline such as the rear propeller shaft 14, the rear wheel differential gear mechanism 16, and the rear wheel axles 18. Part of the power transmitted to the transfer 12 is distributed to the front wheels 3 by the transfer 12 and transmitted to the front wheels 3 sequentially via a front wheel-side driveline such as the front propeller shaft 13, the front wheel differential gear mechanism 15, and the front wheel axles 17. Power is synonymous with torque and force unless otherwise distinguished.

Figure 2:
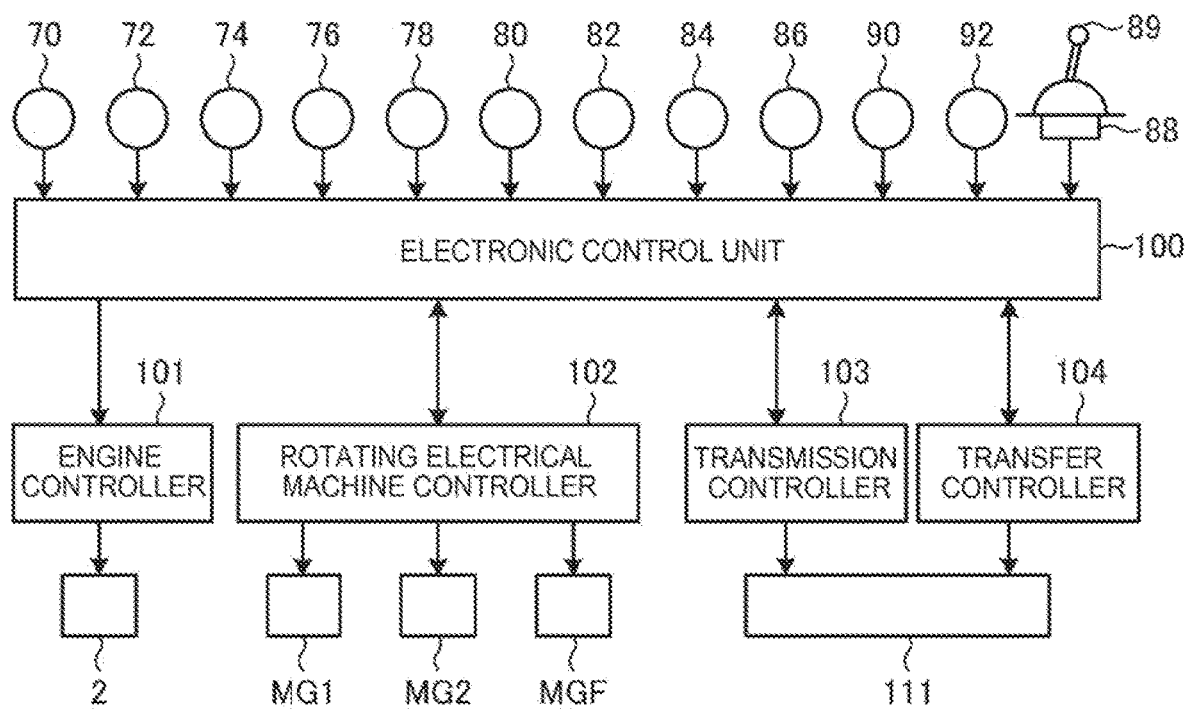
FIG. 2 is a diagram illustrating a main part of a control system for various controls in the drive system according to the first embodiment.

As shown in FIG. 2, the drive system 10 includes the electronic control unit 100. The electronic control unit 100 includes a so-called microcomputer including, for example, a CPU, a RAM, a ROM, input and output interfaces, and other components. The CPU executes various control by processing signals in accordance with programs stored in the ROM in advance while using the temporary storage function of the RAM.

Output signals and the like from various sensors, switches, and the like provided in the vehicle 1 are input to the electronic control unit 100. The various sensors, switches, and the like include, for example, an engine rotation speed sensor 70, an output rotation speed sensor 72, an MG1 rotation speed sensor 74, an MG2 rotation speed sensor 76, an accelerator operation amount sensor 78, a throttle valve opening degree sensor 80, a battery sensor 82, a steering angle sensor 84, a 4WD select switch 86, a shift position sensor 88 of a shift lever 89, a Low select switch 90, a Lock select switch 92, and the like. The electronic control unit 100 calculates a state of charge value SOC [%] as a value indicating the state of charge of a battery that is an electrical storage device based on, for example, a charge-discharge current of the battery, a battery voltage, and the like.

A driver operates a steering wheel provided in a steering apparatus of the vehicle 1. The electronic control unit 100 determines whether the vehicle 1 is turning based on a steering angle detected by the steering angle sensor 84.

Various command signals are respectively output from the electronic control unit 100 to devices provided in the drive system 10. The devices include, for example, the engine controller 101, a rotating electrical machine controller 102, a transmission controller 103, a transfer controller 104, and the like. The various command signals include, for example, an engine control command signal for controlling the engine 2, a rotating electrical machine control command signal for controlling a first rotating electrical machine MG1, a second rotating electrical machine MG2, and a third rotating electrical machine MGF, a hydraulic control command signal for controlling the hydraulic pressure of a hydraulic control circuit 111, and the like. The hydraulic control circuit 111 controls the operation statuses of engagement devices of the combined transmission 11, engagement devices of the transfer 12, and the like.

Figures 3, 4:
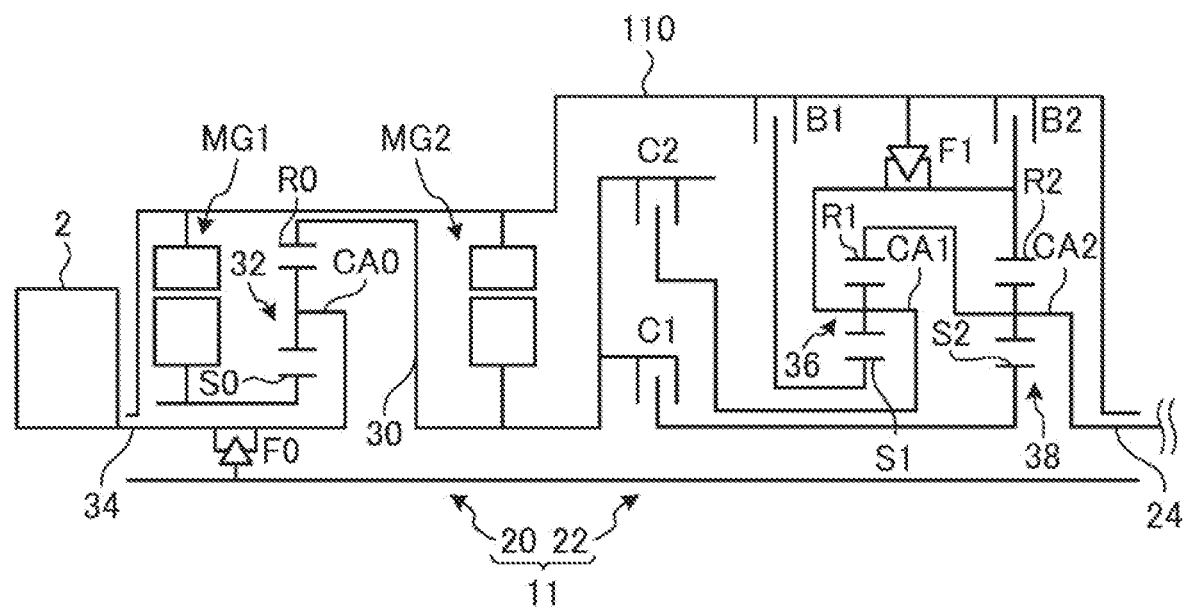
FIG. 3 is a diagram illustrating the schematic configuration of a combined transmission according to the first embodiment.
FIG. 4 is an operation chart illustrating the relationship between a shift stage of a step transmission unit shown in FIG. 3 and a combination of operations of engagement devices.

FIG. 3 is a block diagram illustrating the schematic configuration of the combined transmission 11 according to the first embodiment. Each of the first rotating electrical machine MG1 and the second rotating electrical machine MG2 is a rotating electrical machine having the function of an electric motor and the function of a generator and is a so-called motor generator. Each of the first rotating electrical machine MG1 and the second rotating electrical machine MG2 functions as a driving power source capable of generating driving torque, that is, a first driving source. Each of the first rotating electrical machine MG1 and the second rotating electrical machine MG2 is connected to the battery (not shown) serving as the electrical storage device provided in the vehicle 1 via an inverter (not shown) provided in the vehicle 1. When the inverters are controlled by the rotating electrical machine controller 102, an MG1 torque that is an output torque of the first rotating electrical machine MG1 and an MG2 torque that is an output torque of the second rotating electrical machine MG2 are controlled. An output torque of each rotating electrical machine is a power running torque in an accelerating positive torque and is a regenerative torque in a decelerating negative torque. The battery is an electrical storage device that exchanges electric power with each of the first rotating electrical machine MG1 and the second rotating electrical machine MG2. Therefore, the vehicle 1 is a hybrid vehicle.

The combined transmission 11 includes a continuously variable transmission unit 20 that is an electrical differential unit, a step transmission unit 22 that is a mechanical transmission unit, and the like. The continuously variable transmission unit 20 and the step transmission unit 22 are disposed in series along a common axis in a transmission case 110. The transmission case 110 serves as a non-rotating member attached to a vehicle body. The electrical continuously variable transmission unit 20 is coupled to the engine 2 directly or indirectly via a damper or the like (not shown). The step transmission unit 22 is coupled to an output side of the continuously variable transmission unit 20. An output shaft 24 that is an output rotating member of the step transmission unit 22 is coupled to the transfer 12. In the drive system 10, power output from the engine 2 or the first rotating electrical machine MG1 and the second rotating electrical machine MG2 is transmitted to the step transmission unit 22 and is transmitted to the drive wheels from the step transmission unit 22 via the transfer 12 and the like. The continuously variable transmission unit 20, the step transmission unit 22, and the like are substantially symmetrical with respect to the common axis and the lower half below the axis is omitted in FIG. 3. The common axis is an axis of a crankshaft of the engine 2, a coupling shaft 34, or the like.

The continuously variable transmission unit 20 includes the first rotating electrical machine MG1 and a differential mechanism 32. The differential mechanism 32 serves as a power split device that mechanically distributes the power of the engine 2 between the first rotating electrical machine MG1 and an intermediate transmission member 30 that is an output rotating member of the continuously variable transmission unit 20. The second rotating electrical machine MG2 is coupled to the intermediate transmission member 30 such that power can be transmitted. The continuously variable transmission unit 20 is an electrical differential unit in which the operating status of the first rotating electrical machine MG1 is controlled to control a differential state of the differential mechanism 32. The continuously variable transmission unit 20 is operated as an electrical continuously variable transmission of which a speed ratio is changed. The speed ratio is the value of the ratio between the engine rotation speed and the MG2 rotation speed. The engine rotation speed is equal to the rotation speed of the coupling shaft 34 that is an input rotating member. The MG2 rotation speed is the rotation speed of the intermediate transmission member 30 that is an output rotating member.

The differential mechanism 32 is a single-pinion planetary gear train and includes a sun gear S0, a carrier CA0, and a ring gear R0. The engine 2 is coupled to the carrier CA0 via the coupling shaft 34 such that power can be transmitted. The first rotating electrical machine MG1 is coupled to the sun gear S0 such that power can be transmitted. The second rotating electrical machine MG2 is coupled to the ring gear R0 such that power can be transmitted. In the differential mechanism 32, the carrier CA0 functions as an input element, the sun gear S0 functions as a reaction element, and the ring gear R0 functions as an output element.

The step transmission unit 22 is a mechanical transmission unit serving as a step transmission that makes up part of a driveline between the intermediate transmission member 30 and the transfer 12, that is, a mechanical transmission unit that makes up part of the driveline between the continuously variable transmission unit 20 and the transfer 12. The intermediate transmission member 30 also functions as an input rotating member of the step transmission unit 22. The step transmission unit 22 is a known planetary gear automatic transmission including, for example, a plurality of sets of planetary gear trains and a plurality of engagement devices. The plurality of sets of planetary gear trains includes a first planetary gear train 36 and a second planetary gear train 38. The plurality of engagement devices includes a clutch C1, a clutch C2, a brake B1, a brake B2, and a one-way clutch F1. Hereinafter, the clutch C1, the clutch C2, the brake B1, and the brake B2 are simply referred to as engagement devices CB unless otherwise distinguished.

Each of the engagement devices CB is a hydraulic frictional engagement device that is a multiple disc or single disc clutch or brake that is pressed by a hydraulic actuator, a band brake that is fastened by a hydraulic actuator, or the like. An operation status, which is an engaged state, a released state, or the like, of each of the engagement devices CB is changed by using hydraulic pressures as regulated predetermined hydraulic pressures output from the hydraulic control circuit 111 provided in the vehicle 1.

In the step transmission unit 22, the rotating elements of the first planetary gear train 36 and the second planetary gear train 38 are partially coupled to each other or coupled to the intermediate transmission member 30, the transmission case 110, or the output shaft 24 directly or indirectly via the engagement device CB or the one-way clutch F1. The rotating elements of the first planetary gear train 36 are a sun gear S1, a carrier CA1, and a ring gear R1. The rotating elements of the second planetary gear train 38 are a sun gear S2, a carrier CA2, and a ring gear R2.

The step transmission unit 22 is a step transmission in which any one of multiple speed stages (also referred to as gear stages) having different speed ratios (=AT input rotation speed/output rotation speed) is established by engaging, for example, predetermined engagement devices CB each are any one of the plurality of engagement devices CB. In other words, the gear stage of the step transmission unit 22 is changed, that is, the step transmission unit 22 is shifted, by selectively engaging the plurality of engagement devices CB. The step transmission unit 22 is a step automatic transmission in which each of the multiple gear stages is established. In the first embodiment, gear stages that are established in the step transmission unit 22 are referred to as AT gear stages. The AT input rotation speed is the input rotation speed of the step transmission unit 22, which is the rotation speed of the input rotating member of the step transmission unit 22. The AT input rotation speed is equal to the rotation speed of the intermediate transmission member 30 and is equal to an MG2 rotation speed that is the rotation speed of the second rotating electrical machine MG2. The AT input rotation speed can be expressed by using the MG2 rotation speed. The output rotation speed is the rotation speed of the output shaft 24, which is the output rotation speed of the step transmission unit 22, and is also the output rotation speed of the combined transmission 11 that is an overall transmission including the continuously variable transmission unit 20 and the step transmission unit 22. The combined transmission 11 is a transmission that makes up part of the driveline between the engine 2 and the transfer 12.

FIG. 4 is an operation chart illustrating the relationship between an AT gear stage of the step transmission unit 22 and a combination of operations of the engagement devices CB. In FIG. 4, "ENGAGED" denotes an engaged state, "ENGAGED AS NEEDED" denotes an engaged state as needed, and blank denotes a released state. In the step transmission unit 22, for example, as shown in FIG. 4, four forward AT gear stages, that is, an AT first gear stage ("1st" in FIG. 4), an AT second gear stage ("2nd" in FIG. 4), an AT third gear stage ("3rd" in FIG. 4), and an AT fourth gear stage ("4th" in FIG. 4), and a reverse AT gear stage ("R" in FIG. 4) are established as the multiple AT gear stages. The speed ratio of the AT first gear stage is the largest, and the speed ratio reduces as the AT gear stage becomes higher.

In the step transmission unit 22, the electronic control unit 100 changes an AT gear stage to be established, that is, selectively establishes any one of multiple AT gear stages, in accordance with an accelerator operation of the driver, a vehicle speed, and the like. For example, in shift control over the step transmission unit 22, so-called clutch-to-clutch shift, in which shift is performed by changing one of the engaged engagement devices CB, that is, shift is performed by switching an engaged state of one of the engagement devices CB to a released state and switching a released state of one of the engagement devices CB to an engaged state. In the first embodiment, for example, a downshift from the AT second gear stage to the AT first gear stage is referred to as 2 to 1 downshift. The same applies to the other upshifts and downshifts.

Referring back to FIG. 3, the combined transmission 11 further includes a one-way clutch F0. The one-way clutch F0 is a lock mechanism that is capable of locking the carrier CA0 such that the carrier CA0 does not rotate. In other words, the one-way clutch F0 is a lock mechanism that is capable of locking the coupling shaft 34, which is coupled to the crankshaft of the engine 2 and which integrally rotates with the carrier CA0, to the transmission case 110. The one-way clutch F0 includes two relatively rotatable members. One of the two members is integrally coupled to the coupling shaft 34, and the other member is integrally coupled to the transmission case 110. The one-way clutch F0 idles in a forward rotation direction that is a rotation direction during the operation of the engine 2 and is automatically engaged in a rotation direction reverse to the rotation direction during the operation of the engine 2. Therefore, when the one-way clutch F0 idles, the engine 2 is rotatable relative to the transmission case 110. On the other hand, when the one-way clutch F0 is engaged, the engine 2 is not rotatable relative to the transmission case 110. In other words, by the engagement of the one-way clutch F0, the engine 2 is locked to the transmission case 110. In this way, the one-way clutch F0 allows the rotation of the carrier CA0 in a forward rotation direction that is the rotation direction during the operation of the engine 2 and stops the rotation of the carrier CA0 in a reverse rotation direction. In other words, the one-way clutch F0 is a lock mechanism that is capable of allowing the rotation of the engine 2 in the forward rotation direction and stopping the rotation in the reverse rotation direction.

In the combined transmission 11, the step transmission unit 22 in which any one of the AT gear stages is established and the continuously variable transmission unit 20 that is operated as a continuously variable transmission make up a continuously variable transmission in which the continuously variable transmission unit 20 and the step transmission unit 22 are arranged in series. Alternatively, since the continuously variable transmission unit 20 is capable of shifting speeds as in the case of a step transmission, the combined transmission 11 is able to shift speeds like a step transmission as a whole. In other words, in the combined transmission 11, it is possible to control the step transmission unit 22 and the continuously variable transmission unit 20 such that multiple gear stages having different speed ratios that indicate the values of the ratio of the engine rotation speed to the output rotation speed are selectively established.

Figure 5:
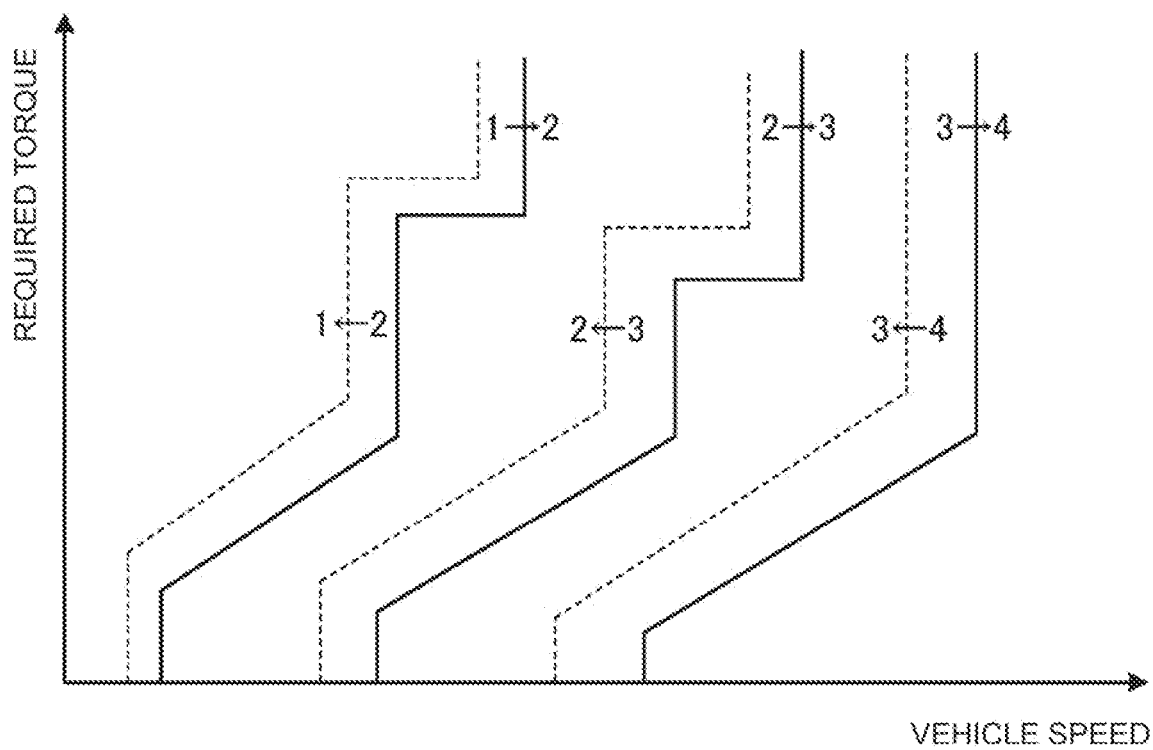
FIG. 5 is a view showing an example of a shift map used in shift control over the step transmission unit.

The electronic control unit 100 determines whether to shift the step transmission unit 22 by using, for example, an AT gear stage shift map shown in FIG. 5 that is a relationship determined in advance and, where necessary, executes shift control over the step transmission unit 22 via the transmission controller 103. In shift control over the step transmission unit 22, the transmission controller 103 outputs hydraulic control command signals for changing the engaged and released states of the engagement devices CB to the hydraulic control circuit 111 by solenoid valves such that the AT gear stage of the step transmission unit 22 is automatically changed.

The AT gear stage shift map shown in FIG. 5 is, for example, a predetermined relationship having shift lines for determining whether to shift the step transmission unit 22 on two-dimensional coordinates with a vehicle speed and a required driving torque calculated based on an accelerator operation amount as variables. In the AT gear stage shift map, an output rotation speed or the like may be used instead of a vehicle speed, and a required driving force, an accelerator operation amount, a throttle valve opening degree, or the like may be used instead of a required driving torque. In the AT gear stage shift map shown in FIG. 5, shift lines represented by the continuous lines are upshift lines for determining an upshift, and shift lines represented by the dashed lines are downshift lines for determining a downshift.

Figure 6:
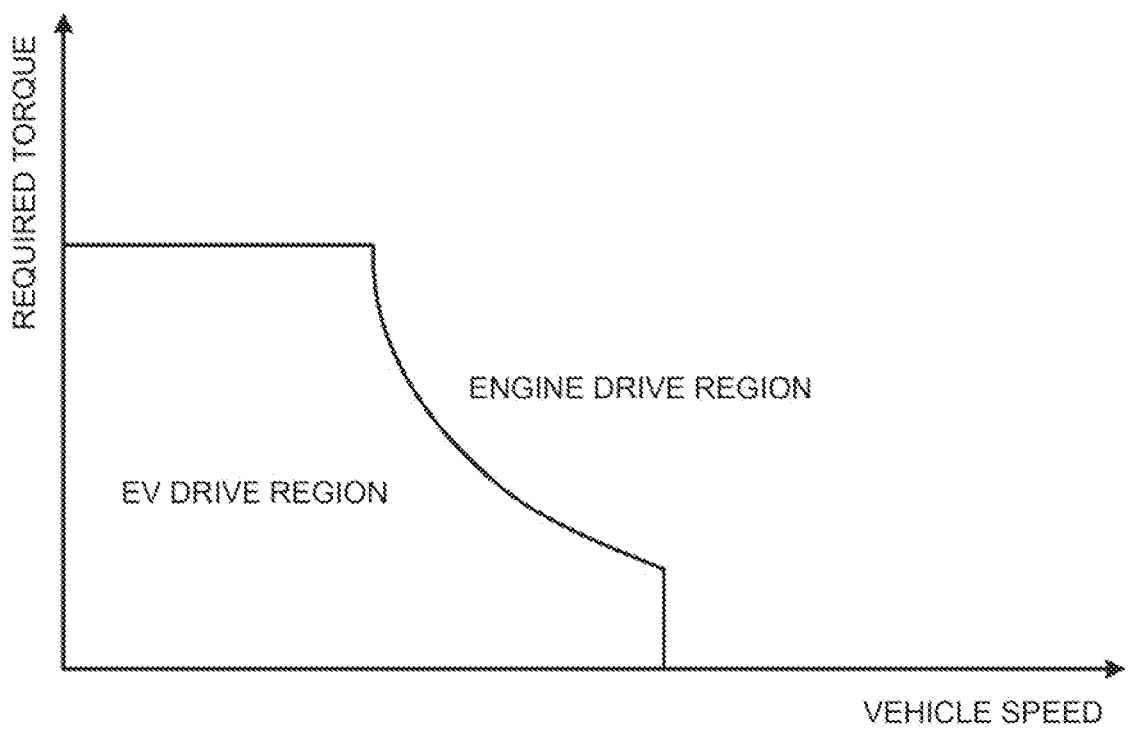
FIG. 6 is a graph showing an example of a power source switching map used in switching control between an EV drive mode and an engine drive mode of the vehicle shown in FIG. 1.

FIG. 6 is a graph showing an example of a power source switching map used in control to switch between an EV drive mode and an engine drive mode. In the drive system 10 according to the first embodiment, the EV drive mode and the engine drive mode are switched based on the power source switching map used in control to switch between the EV drive mode and the engine drive mode as shown in FIG. 6. The map shown in FIG. 6 is a predetermined relationship having a boundary line between an engine drive region in which the vehicle 1 runs in the engine drive mode and an EV drive region in which the vehicle 1 runs in the EV drive mode on two-dimensional coordinates having a vehicle speed and a required driving torque as variables. The boundary line between the EV drive region and the engine drive region in FIG. 6 is, in other words, a switching line for switching between the EV drive mode and the engine drive mode.

Figure 7:
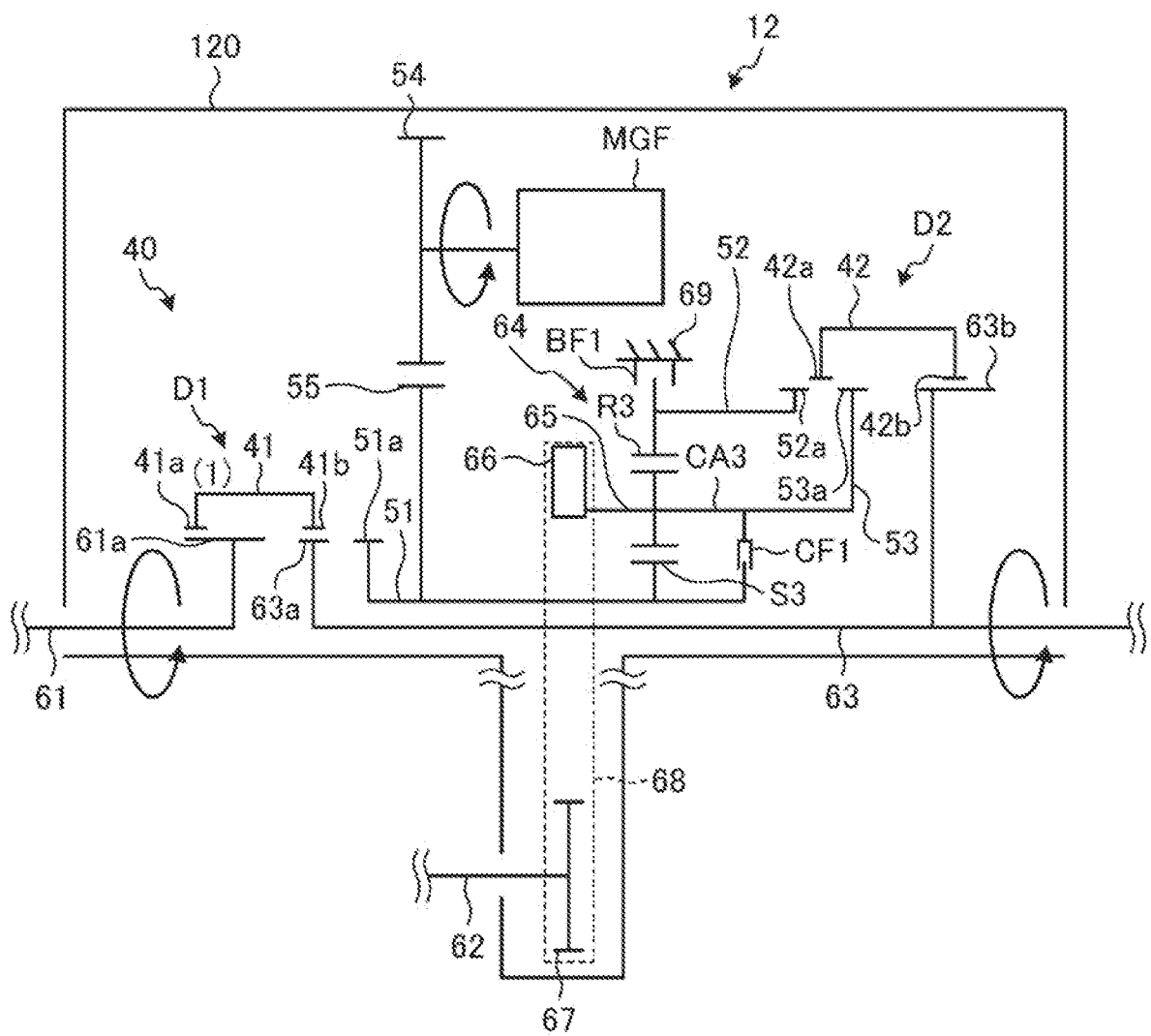
FIG. 7 is a skeletal view schematically showing a transfer according to the first embodiment shown in FIG. 1 and is a skeletal view showing a case where the transfer is in a first drive state.

FIG. 7 is a skeletal view schematically showing the transfer 12 according to the first embodiment and is a skeletal view showing a case where the transfer 12 is in a first drive state.

The transfer 12 of the first embodiment includes a transfer case 120 that is a non-rotating member. The transfer 12 includes an input shaft 61, a rear wheel output shaft 63 serving as a first output shaft that outputs power to the rear wheels 4, a front wheel output shaft 62 serving as a second output shaft that outputs power to the front wheels 3, and a third planetary gear train 64 serving as a differential mechanism in the transfer case 120. The transfer 12 includes a transmission member 65 that functions as an input rotating member to the front wheels 3, a drive gear 66 that outputs power to the front wheel output shaft 62, a driven gear 67 provided integrally with the front wheel output shaft 62, and a front wheel drive chain 68 that couples the drive gear 66 and the driven gear 67 as rotating members that make up a driveline for the front wheels 3 in the transfer case 120. The transfer 12 includes the third rotating electrical machine MGF serving as a second power source, a connection switching device 40 that switches the connection statuses of the rotating members, a clutch CF1, and a brake BF1 in the transfer case 120.

The input shaft 61 is an input rotating member that inputs power from the first power source such as the engine 2 to the transfer 12. Power from the combined transmission 11 is input to the input shaft 61. For example, the input shaft 61 is spline-fitted to the output shaft 24 that is the output rotating member of the combined transmission 11.

The rear wheel output shaft 63 is an output rotating member that outputs power from the transfer 12 to the rear wheels 4. The rear wheel output shaft 63 is a drive shaft disposed in the same axis as the input shaft 61 and coupled to the rear propeller shaft 14 (see FIG. 1).

The front wheel output shaft 62 is an output rotating member that outputs power from the transfer 12 to the front wheels 3. The front wheel output shaft 62 is a drive shaft disposed in an axis different from the input shaft 61 or the rear wheel output shaft 63 and coupled to the front propeller shaft 13 (see FIG. 1). The front wheel output shaft 62 rotates via the front wheel drive chain 68 and the driven gear 67 when the drive gear 66 rotates.

The drive gear 66 is coupled to the transmission member 65 so as to integrally rotate with the transmission member 65. The transmission member 65 is a rotating member that transmits power to the front wheel output shaft 62. The transmission member 65 and the drive gear 66 are disposed so as to be rotatable relative to the rear wheel output shaft 63. In the transfer 12, the transmission member 65, the drive gear 66, and the third planetary gear train 64 are disposed in the same rotation center as the rear wheel output shaft 63.

The third planetary gear train 64 is configured as a single-pinion planetary gear train including three rotating elements. As shown in FIG. 7, the third planetary gear train 64 includes a sun gear S3, a carrier CA3 that supports a plurality of pairs of mutually meshing pinion gears such that the pinion gears are rotatable and revolvable, and a ring gear R3 that meshes with the sun gear S3 via the pinion gears as the three rotating elements. The third rotating electrical machine MGF is constantly coupled to the sun gear S3.

A first rotating member 51 that can be coupled to the input shaft 61 is coupled to the sun gear S3. The first rotating member 51 is a member that integrally rotates with the sun gear S3 and has gear teeth 51a. An input gear 55 is connected to the first rotating member 51. Power from the third rotating electrical machine MGF is input to the input gear 55. The input gear 55 and the first rotating member 51 integrally rotate.

A third rotating member 53 that can be coupled to the rear wheel output shaft 63 is coupled to the carrier CA3. The third rotating member 53 is a member that integrally rotates with the carrier CA3 and has gear teeth 52a. The transmission member 65 is coupled to the carrier CA3. The transmission member 65 is a member that integrally rotates with the carrier CA3.

A second rotating member 52 that can be coupled to the rear wheel output shaft 63 is coupled to the ring gear R3. The second rotating member 52 is a member that integrally rotates with the ring gear R3 and has gear teeth 52a.

The third rotating electrical machine MGF is a motor generator (MG) capable of functioning as an electric motor and a generator. The third rotating electrical machine MGF includes a rotor, a stator, and an output shaft that integrally rotates with the rotor and is electrically connected to the battery via an inverter. As shown in FIG. 7, an output gear 54 is provided on the output shaft of the third rotating electrical machine MGF. The output gear 54 is in mesh with the input gear 55. A reduction gear train is made up of the output gear 54 and the input gear 55. Therefore, when an MGF torque that is an output torque of the third rotating electrical machine MGF is transmitted to the input gear 55, the rotation of the third rotating electrical machine MGF is shifted in speed (reduced in speed) and transmitted to the sun gear S3.

The connection switching device 40 is a device that selectively switches a destination to which each of the input shaft 61 and the rear wheel output shaft 63 is connected. In other words, the connection switching device 40 is a device that switches the connection statuses of the rotating members that make up the transfer 12. Specifically, the connection switching device 40 selectively switches a destination to which each of the first rotating member 51, the second rotating member 52, and the third rotating member 53 that respectively integrally rotate with the rotating elements of the third planetary gear train 64 is connected. As shown in FIG. 7, the connection switching device 40 includes a first dog clutch D1 and a second dog clutch D2.

The first dog clutch D1 is a first connect-disconnect mechanism that switches a destination to which the input shaft 61 is connected. As shown in FIG. 7, the first dog clutch D1 selectively couples the input shaft 61 to the first rotating member 51 (sun gear S3) or the rear wheel output shaft 63. In other words, the first dog clutch D1 switches between a first input state in which power from the input shaft 61 is transmitted to the rear wheel output shaft 63 without intervening the third planetary gear train 64 and a second input state in which power from the input shaft 61 is transmitted to the rear wheel output shaft 63 via the third planetary gear train 64.

The first dog clutch D1 includes a first switching sleeve 41 serving as a switching member. The first switching sleeve 41 includes first gear teeth 41a that mesh with the gear teeth 61a of the input shaft 61, and second gear teeth 41b that mesh with the first gear teeth 63a of the rear wheel output shaft 63 or the gear teeth 51a of the first rotating member 51. The first switching sleeve 41 moves in the axial direction by an actuator of the first dog clutch D1. The first switching sleeve 41 switches among a first input state in which, in a state where the first gear teeth 41a are constantly in mesh with the gear teeth 61a of the input shaft 61, the second gear teeth 41b mesh with the first gear teeth 63a of the rear wheel output shaft 63, a released state in which the second gear teeth 41b do not mesh with any of the first gear teeth 63a of the rear wheel output shaft 63 and the gear teeth 51a of the first rotating member 51, and a second input state in which the second gear teeth 41b are in mesh with the gear teeth 51a of the first rotating member 51.

The second dog clutch D2 is a second connect-disconnect mechanism that switches a destination to which the rear wheel output shaft 63 is connected. The second dog clutch D2 selectively couples the rear wheel output shaft 63 to the second rotating member 52 (ring gear R3) or the third rotating member 53 (carrier CA3). In other words, the second dog clutch D2 switches between a first transmission state in which power is transmitted between the rear wheel output shaft 63 and the second rotating member 52 (ring gear R3) and a second transmission state in which power is transmitted between the rear wheel output shaft 63 and the third rotating member 53 (carrier CA3). The second dog clutch D2 that is the second connect-disconnect mechanism is an example of a connect-disconnect mechanism of the disclosure.

The second dog clutch D2 includes a second switching sleeve 42 serving as a switching member. The second switching sleeve 42 has first gear teeth 42a and second gear teeth 42b. The first gear teeth 42a of the second switching sleeve 42 are able to selectively mesh with the gear teeth 52a of the second rotating member 52 that integrally rotates with the ring gear R3 or the gear teeth 53a of the third rotating member 53 that integrally rotates with the carrier CA3. The second switching sleeve 42 moves in the axial direction by an actuator of the second dog clutch D2. The second switching sleeve 42 switches among a first transmission state in which, in a state where the second gear teeth 42b are constantly in mesh with the second gear teeth 63b of the rear wheel output shaft 63, the first gear teeth 42a mesh with the gear teeth 52a of the second rotating member 52, a released state in which the first gear teeth 42a do not mesh with any of the gear teeth 52a of the second rotating member 52 and the gear teeth 53a of the third rotating member 53, and a second transmission state in which the first gear teeth 42a are in mesh with the gear teeth 53a of the third rotating member 53.

The clutch CF1 is a first engagement element of a differential mechanism. The clutch CF1 selectively engages the sun gear S3 with the carrier CA3 in the third planetary gear train 64 serving as the differential mechanism to integrally rotate the sun gear S3, the carrier CA3, and the ring gear R3.

The brake BF1 is a second engagement element of the differential mechanism. The brake BF1 selectively fixes the ring gear R3 of the third planetary gear train 64 serving as the differential mechanism to the fixing member 69. The fixing member 69 is the transfer case 120 itself or a non-rotating member integrated with the transfer case 120. The transfer 12 is set to a high-speed shift stage Hi when the brake BF1 is released and is set to a low-speed shift stage Lo when the brake BF1 is engaged.

Figure 8:
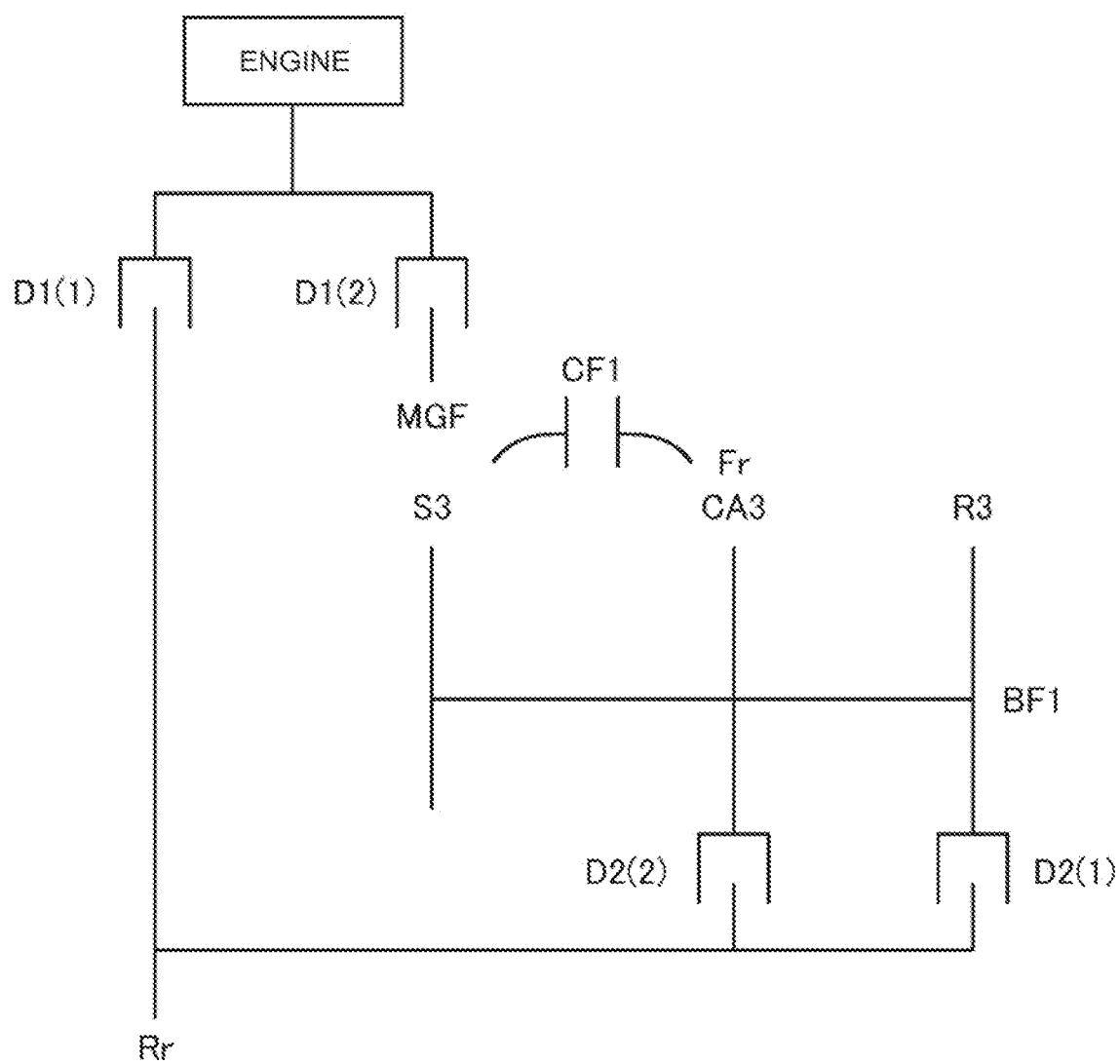
FIG. 8 is a view showing an engagement relationship among rotating members in the transfer according to the first embodiment.

FIG. 8 is a diagram showing an engagement relationship among the rotating members in the transfer 12 according to the first embodiment. In FIG. 8, the third rotating electrical machine MGF is represented by MGF, the sun gear S3 is represented by S3, the carrier CA3 is represented by CA3, the ring gear R3 is represented by R3, the brake BF1 is represented by BF1, the clutch CF1 is represented by CF1, the front wheel output shaft 62 is represented by Fr, and the rear wheel output shaft 63 is represented by Rr. In FIG. 8, D1(1) indicates a coupling point of the first dog clutch D1 in the first input state, and D1(2) indicates a coupling point of the first dog clutch D1 in the second input state. In FIG. 8, D2(1) indicates a coupling point of the second dog clutch D2 in the first transmission state, and D2(2) indicates a coupling point of the second dog clutch D2 in the second transmission state.

The transfer 12 of the first embodiment is connected to the engine 2 or the like serving as the first power source and includes the rear wheel output shaft 63, the front wheel output shaft 62, and the third planetary gear train 64. The rear wheel output shaft 63 is the first output shaft that outputs power to the rear wheels 4 that are one of the pair of front wheels 3 and the pair of rear wheels 4. The front wheel output shaft 62 is the second output shaft that outputs power to the front wheels 3 that are the other one of the pair of front wheels 3 and the pair of rear wheels 4. The third planetary gear train 64 is the differential mechanism including the sun gear S3 that is the first rotating element, the carrier CA3 that is the second rotating element, and the ring gear R3 that is the third rotating element. In the transfer 12 of the first embodiment, the third planetary gear train 64 is configured such that the third rotating electrical machine MGF that is the second power source is connected to the sun gear S3, the front wheel output shaft 62 that is one of the front wheel output shaft 62 and the rear wheel output shaft 63 is connected to the carrier CA3, and the rear wheel output shaft 63 that is the other one of the front wheel output shaft 62 and the rear wheel output shaft 63 is connected to the ring gear R3 so as to be able to be connected to or disconnected from the ring gear R3 by the second dog clutch D2 that is the connect-disconnect mechanism. The third planetary gear train 64 includes the clutch CF1 and the brake BF1. The clutch CF1 is the first engagement element and selectively engages the sun gear S3 with the carrier CA3. The brake BF1 is the second engagement element and selectively fixes the ring gear R3 to the fixing member 69. Thus, when the second dog clutch D2 is set to a connected state in which the rear wheel output shaft 63 is connected to the ring gear R3, the vehicle 1 is able to be caused to run in a four-wheel drive state by using power output from at least the first power source such as the engine 2. When the second dog clutch D2 is set to a disconnected state in which the rear wheel output shaft 63 is disconnected from the ring gear R3 and the clutch CF1 is engaged to integrally rotate the sun gear S3, the carrier CA3, and the ring gear R3 or the brake BF1 is engaged to fix the ring gear R3 to the fixing member 69, the vehicle 1 is able to be caused to run in a two-wheel drive state by using power output from the second power source that is the third rotating electrical machine MGF.

The transfer 12 of the first embodiment is configured such that the drive state is switched by the electronic control unit 100 and can be set to any one of a first drive state, a second drive state, a third drive state, a fourth drive state, a fifth drive state, and a sixth drive state.

Here, the first drive state to the sixth drive state will be described. FIG. 9 is an operation chart showing the relationship between each drive state and each of the operation statuses of the engagement devices in the transfer 12. In FIG. 9, "ENGAGED" denotes an engaged state, and blank denotes a released state.

The first drive state shown in FIG. 7 is a drive state in an EV(FF)_Hi EV drive mode in which the vehicle 1 is caused to run by using power from the third rotating electrical machine MGF and is a two-wheel drive state in which the power of the third rotating electrical machine MGF is transmitted to only the front wheels 3. In the first drive state, the transfer 12 is set to the high-speed shift stage Hi. In the first drive state, the step transmission unit 22 of the combined transmission 11 is set to a neutral state.

When the transfer 12 is in the first drive state, the brake BF1 is released, the clutch CF1 is engaged, the first dog clutch D1 is in the first input state, and the second dog clutch D2 is released, as shown in FIG. 9. In FIG. 7, (1) in the first dog clutch D1 denotes that the first dog clutch D1 is in the first input state. In the first drive state, the third planetary gear train 64 is in a direct coupling state in which the sun gear S3 and the carrier CA3 are coupled by the clutch CF1. In the first drive state, when the power of the third rotating electrical machine MGF is transmitted to the front wheel output shaft 62, the rotation of the third rotating electrical machine MGF is transmitted to the front wheel output shaft 62 without being shifted in speed in the third planetary gear train 64.

Figure 10:
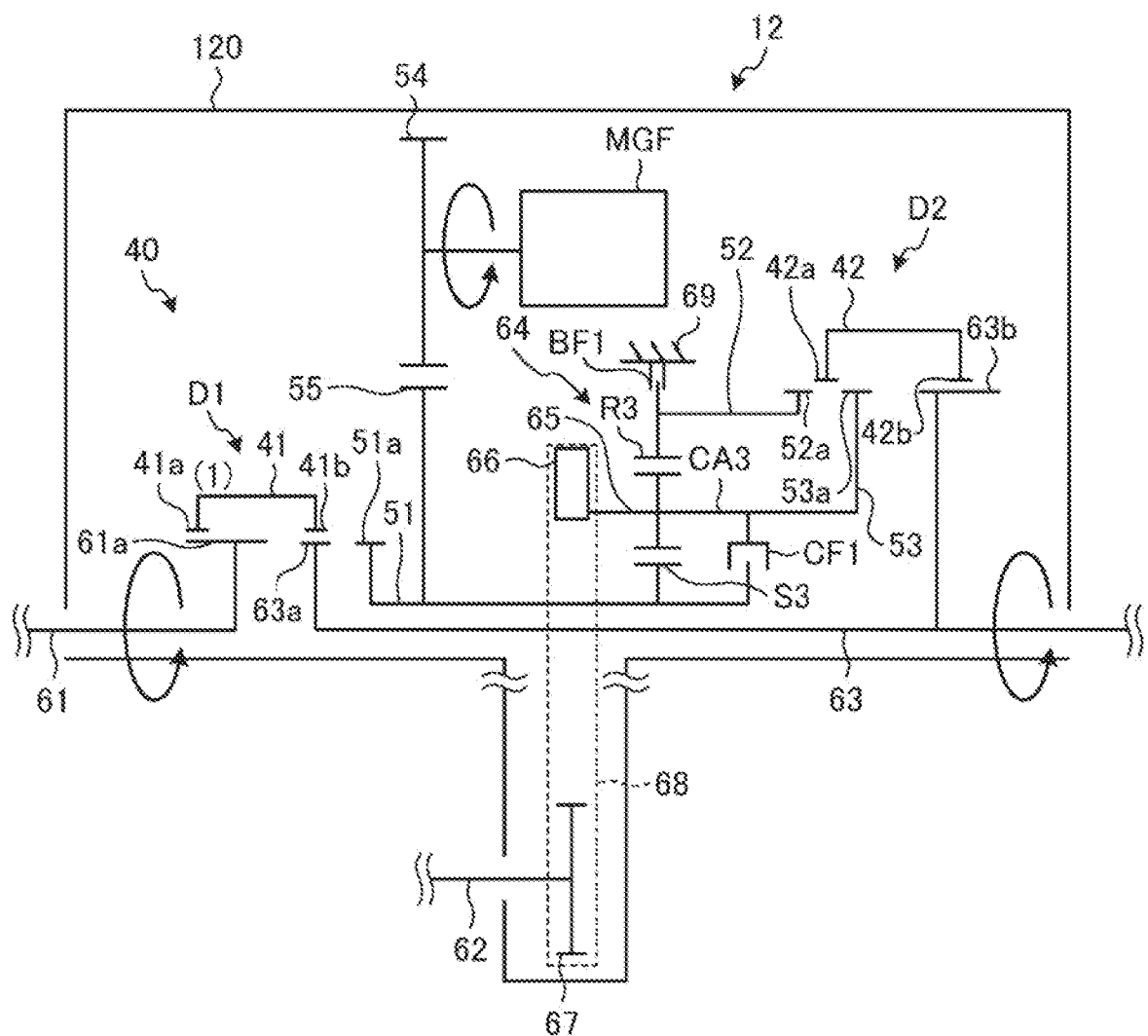
FIG. 10 is a skeletal view showing a case where the transfer according to the first embodiment is in a second drive state.

FIG. 10 is a skeletal view showing a case where the transfer 12 according to the first embodiment is in the second drive state. The second drive state is a drive state in an EV(FF)_Lo EV drive mode in which the vehicle 1 is caused to run by using power from the third rotating electrical machine MGF and is a two-wheel drive state in which the power of the third rotating electrical machine MGF is transmitted to only the front wheels 3. In the second drive state, the transfer 12 is set to the low-speed shift stage Lo. In the second drive state, the step transmission unit 22 of the combined transmission 11 is set to a neutral state.

When the transfer 12 is in the second drive state, the brake BF1 is engaged, the clutch CF1 is released, the first dog clutch D1 is in the first input state, and the second dog clutch D2 is released, as shown in FIG. 9. In FIG. 10, (1) in the first dog clutch D1 denotes that the first dog clutch D1 is in the first input state. In the second drive state, the third planetary gear train 64 is in a speed reduction state in which the ring gear R3 is fixed to the fixing member 69 by the brake BF1. In the second drive state, when the power of the third rotating electrical machine MGF is transmitted to the front wheel output shaft 62, the rotation of the third rotating electrical machine MGF is reduced in speed in the third planetary gear train 64 and then transmitted to the front wheel output shaft 62.

Figure 11:
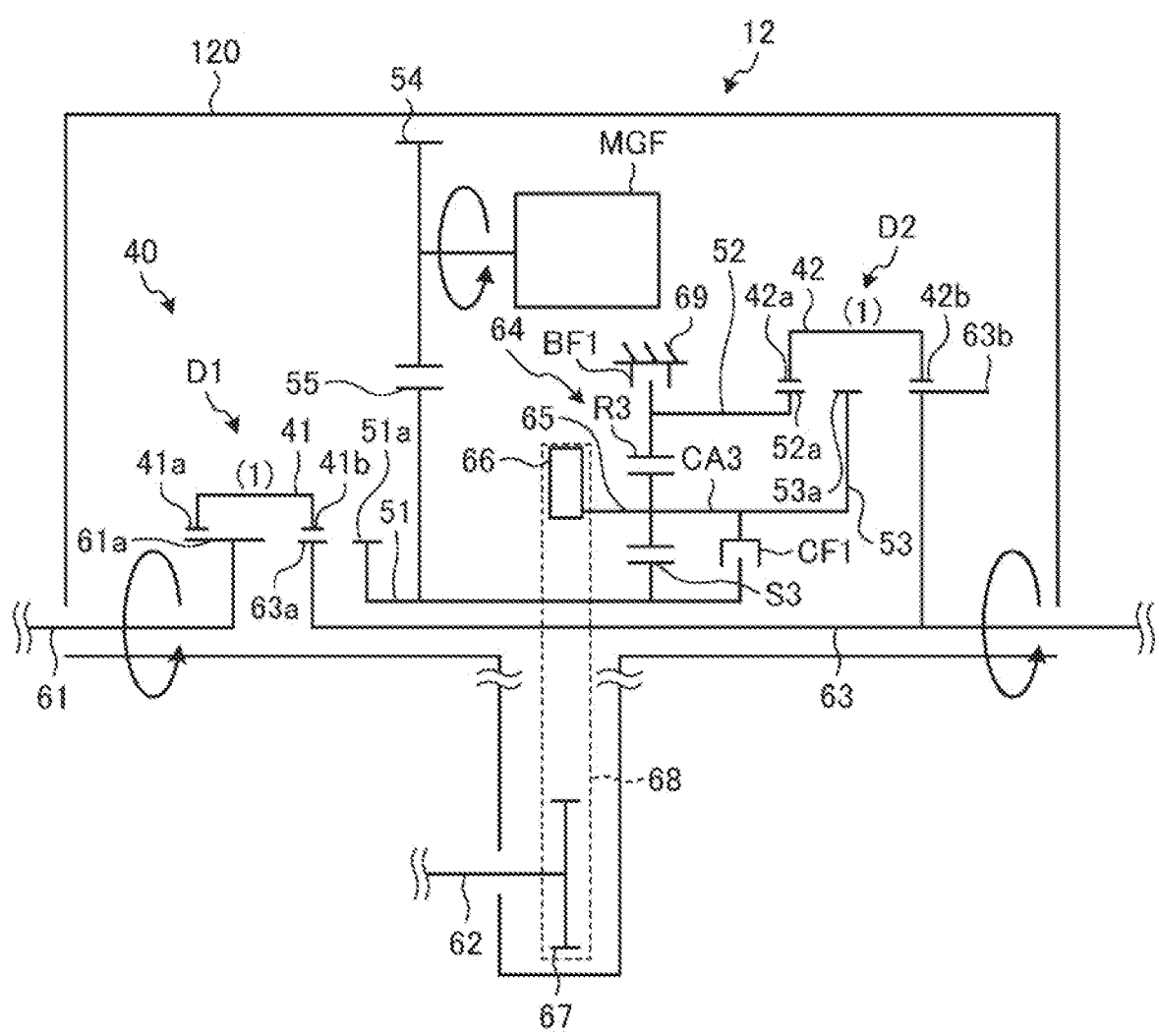
FIG. 11 is a skeletal view showing a case where the transfer according to the first embodiment is in a third drive state.

FIG. 11 is a skeletal view showing a case where the transfer 12 according to the first embodiment is in the third drive state. The third drive state is a drive state in an H4_torque split mode in which the vehicle 1 is caused to run while power transmitted to the transfer 12 is distributed to the front wheel 3 side and the rear wheel 4 side and is a four-wheel drive state in which power is transmitted to the front wheels 3 and the rear wheels 4. In the third drive state, a torque distribution ratio to distribute torque from the input shaft 61 between the front wheel output shaft 62 and the rear wheel output shaft 63 is changed by the MGF torque of the third rotating electrical machine MGF. In other words, the sun gear S3 of the third planetary gear train 64 bears torque transmitted from the rear wheel output shaft 63 to the ring gear R3 of the third planetary gear train 64 by using the MGF torque of the third rotating electrical machine MGF as a reaction force. Thus, the torque transmitted to the ring gear R3 is distributed to the front wheel 3 side and the rear wheel 4 side at a selected ratio. In the third drive state, the transfer 12 is set to the high-speed shift stage Hi.

When the transfer 12 is in the third drive state, the brake BF1 is released, the clutch CF1 is released, the first dog clutch D1 is in the first input state, and the second dog clutch D2 is in the first transmission state, as shown in FIG. 9. In FIG. 11, (1) in the first dog clutch D1 denotes that the first dog clutch D1 is in the first input state. In FIG. 11, (1) in the second dog clutch D2 denotes that the second dog clutch D2 is in the first transmission state.

Figure 12:
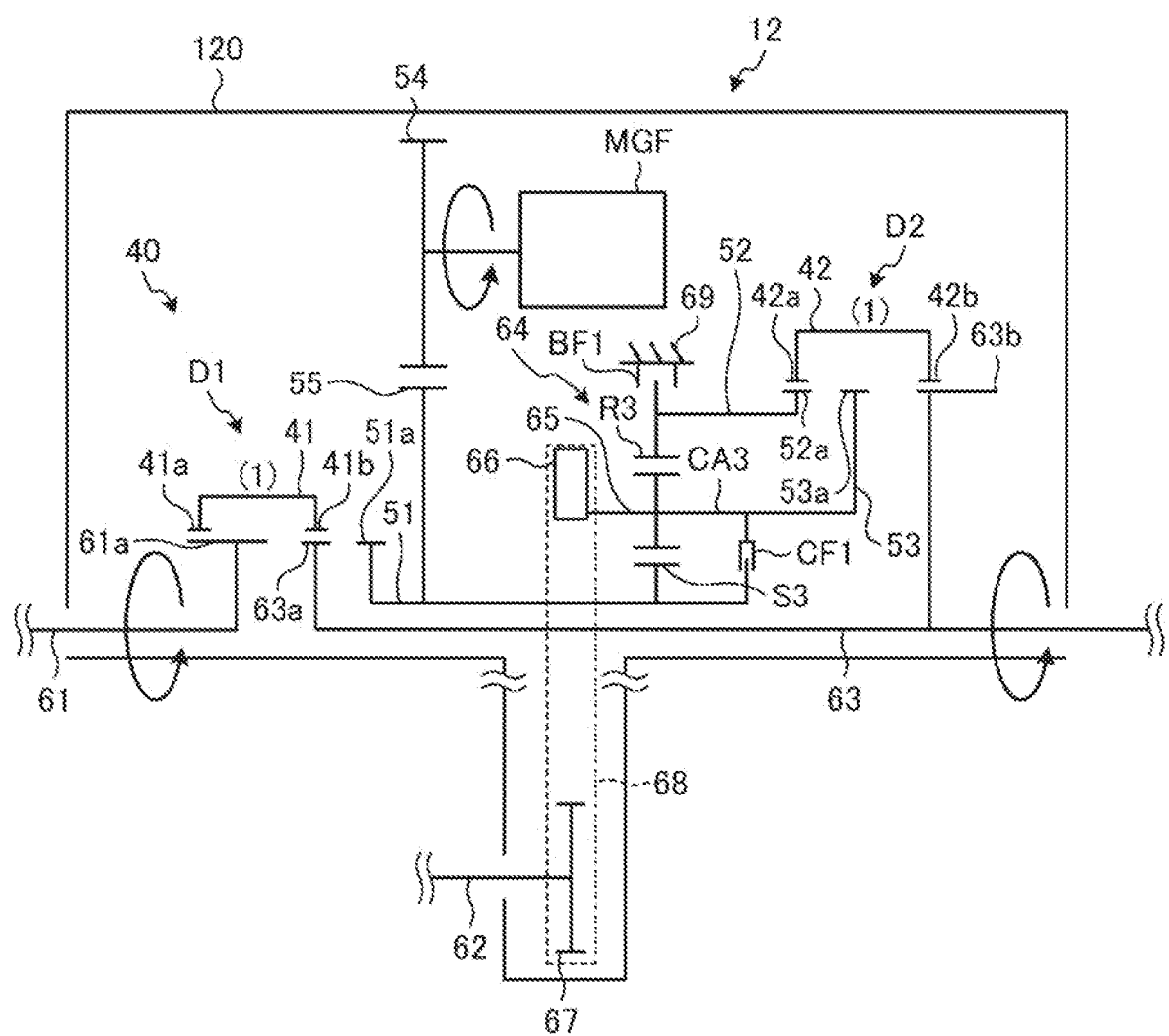
FIG. 12 is a skeletal view showing a case where the transfer according to the first embodiment is in a fourth drive state.

FIG. 12 is a skeletal view showing a case where the transfer 12 according to the first embodiment is in the fourth drive state. The fourth drive state is a drive state in an H4_LSD mode in which the vehicle 1 is caused to run while power transmitted to the transfer 12 is distributed to the front wheel 3 side and the rear wheel 4 side and is a four-wheel drive state in which power is transmitted to the front wheels 3 and the rear wheels 4. The fourth drive state is a drive state in which differential rotation between the front wheel output shaft 62 and the rear wheel output shaft 63 is restricted by engagement control over the clutch CF1. In the fourth drive state, the torque distribution ratio at which torque from the input shaft 61 is distributed between the front wheel output shaft 62 and the rear wheel output shaft 63 is changed through engagement control over the clutch CF1. In the fourth drive state, the transfer 12 is set to the high-speed shift stage Hi.

When the transfer 12 is in the fourth drive state, the brake BF1 is released, the clutch CF1 is in an engagement control (half engaged) state, the first dog clutch D1 is in the first input state, and the second dog clutch D2 is in the first transmission state, as shown in FIG. 9. In FIG. 12, (1) in the first dog clutch D1 denotes that the first dog clutch D1 is in the first input state. In FIG. 12, (1) in the second dog clutch D2 denotes that the second dog clutch D2 is in the first transmission state.

Figure 13:
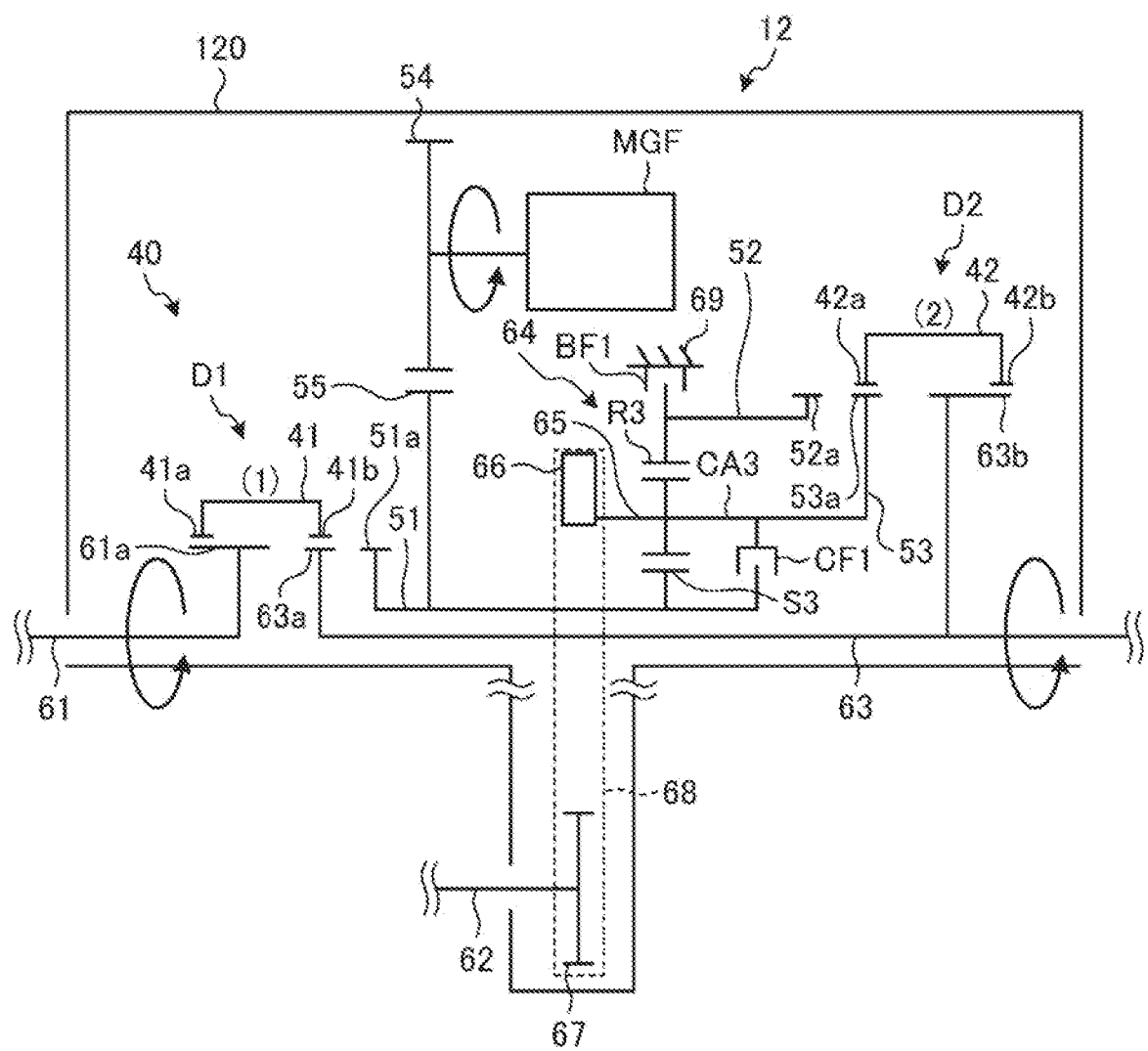
FIG. 13 is a skeletal view showing a case where the transfer according to the first embodiment is in a fifth drive state.

FIG. 13 is a skeletal view showing a case where the transfer 12 according to the first embodiment is in the fifth drive state. The fifth drive state is a drive state in an H4_Lock (fixed distribution 4WD) mode in which the vehicle 1 is caused to run while power transmitted to the transfer 12 is distributed to the front wheel 3 side and the rear wheel 4 side and is a four-wheel drive state in which power is transmitted to the front wheels 3 and the rear wheels 4. The fifth drive state is a drive state in which differential rotation between the front wheel output shaft 62 and the rear wheel output shaft 63 is disabled, and the torque distribution ratio at which torque from the input shaft 61 is distributed between the front wheel output shaft 62 and the rear wheel output shaft 63 is fixed. In the fifth drive state, the transfer 12 is set to the high-speed shift stage Hi. Here, in the fifth drive state, the third rotating electrical machine MGF may be added to the driving power source.

When the transfer 12 is in the fifth drive state, the brake BF1 is released, the clutch CF1 is released, the first dog clutch D1 is in the first input state, and the second dog clutch D2 is in the second transmission state, as shown in FIG. 9. In FIG. 13, (1) in the first dog clutch D1 denotes that the first dog clutch D1 is in the first input state. In FIG. 13, (2) in the second dog clutch D2 denotes that the second dog clutch D2 is in the second transmission state.

Figure 14:
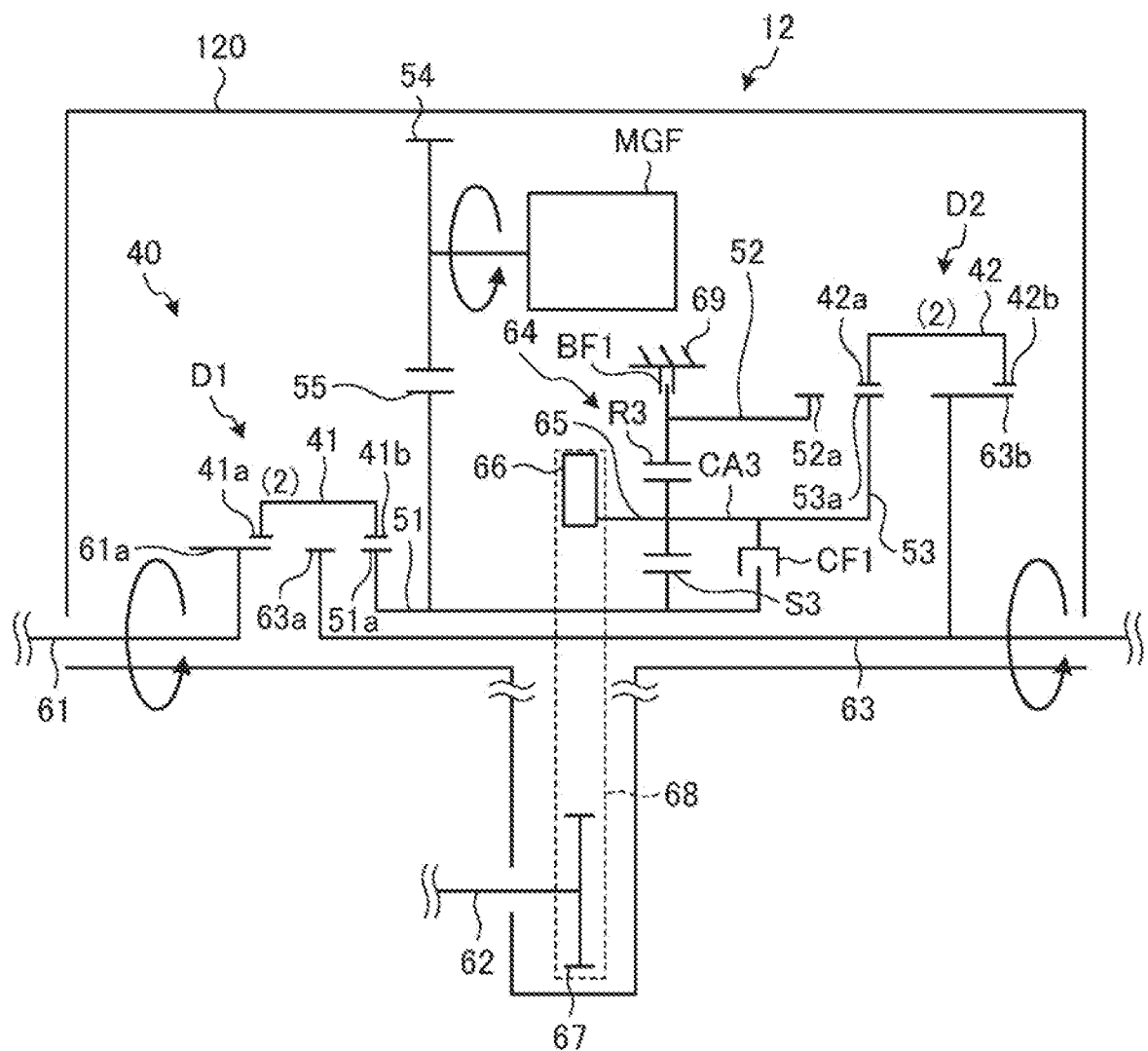
FIG. 14 is a skeletal view showing a case where the transfer according to the first embodiment is in a sixth drive state.

FIG. 14 is a skeletal view showing a case where the transfer 12 according to the first embodiment is in the sixth drive state. The sixth drive state is a drive state in an L4_Lock (fixed distribution 4WD) mode in which the vehicle 1 is caused to run while power transmitted to the transfer 12 is distributed to the front wheel 3 side and the rear wheel 4 side and is a four-wheel drive state in which power is transmitted to the front wheels 3 and the rear wheels 4. The sixth drive state is a drive state in which differential rotation between the front wheel output shaft 62 and the rear wheel output shaft 63 is disabled, and the torque distribution ratio at which torque from the input shaft 61 is distributed between the front wheel output shaft 62 and the rear wheel output shaft 63 is fixed. In the sixth drive state, the transfer 12 is set to the low-speed shift stage Lo. Here, in the sixth drive state, the third rotating electrical machine MGF may be added to the driving power source.

When the transfer 12 is in the sixth drive state, the brake BF1 is engaged, the clutch CF1 is released, the first dog clutch D1 is in the second input state, and the second dog clutch D2 is in the second transmission state, as shown in FIG. 9. In FIG. 14, (2) in the first dog clutch D1 denotes that the first dog clutch D1 is in the second input state. In FIG. 14, (2) in the second dog clutch D2 denotes that the second dog clutch D2 is in the second transmission state.

In the transfer 12 of the first embodiment, the drive state is enabled to switch among the first drive state, the second drive state, the third drive state, and the fourth drive state according to the running status of the vehicle 1. The drive state can be switched from the fifth drive state to any one of the third drive state and the fourth drive state or switched from any one of the third drive state and the fourth drive state to the fifth drive state by the driver turning on or off the Lock select switch 92 provided in the vehicle 1. The drive state can be switched from the sixth drive state to the fifth drive state or switched from the fifth drive state to the sixth drive state by the driver turning on or off the Low select switch 90 provided in the vehicle 1.

To switch the drive state of the transfer 12, the electronic control unit 100 controls the hydraulic control circuit 111 by using the transfer controller 104 and controls the actuators for operating the first dog clutch D1 and the second dog clutch D2 and the operation statuses of the brake BF1 and the clutch CF1 based on output signals from the various sensors installed in the vehicle 1, the 4WD select switch 86, the Low select switch 90, and the like.

When the first drive mode in which the vehicle 1 is caused to run in the four-wheel drive state by using power output from at least the first power source is set, the electronic control unit 100 sets the second dog clutch D2 to a connected state in which the rear wheel output shaft 63 and the ring gear R3 of the third planetary gear train 64 are connected. When the second drive mode in which the vehicle 1 is caused to run in the two-wheel drive state by using power output from the third rotating electrical machine MGF is set, the electronic control unit 100 sets the second dog clutch D2 to a disconnected state in which the rear wheel output shaft 63 is disconnected from the ring gear R3, and engages the clutch CF1 to integrally rotate the sun gear S3, the carrier CA3, and the ring gear R3 or engages the brake BF1 to fix the ring gear R3 to the fixing member 69. In the drive system 10 according to the first embodiment, the H4_torque spilt mode, the H4_LSD mode, and the like correspond to the first drive mode, and the EV(FF)_Hi mode and the EV(FF)_Lo mode correspond to the second drive mode.

Here, in the drive system 10 according to the first embodiment, when the vehicle 1 is turning, the electronic control unit 100 prohibits at least one of switching of the drive mode from the first drive mode to the second drive mode and switching of the drive mode from the second drive mode to the first drive mode. Thus, an influence on the behavior of the vehicle resulting from switching of the drive mode when the vehicle 1 is turning is reduced.

Figure 15:
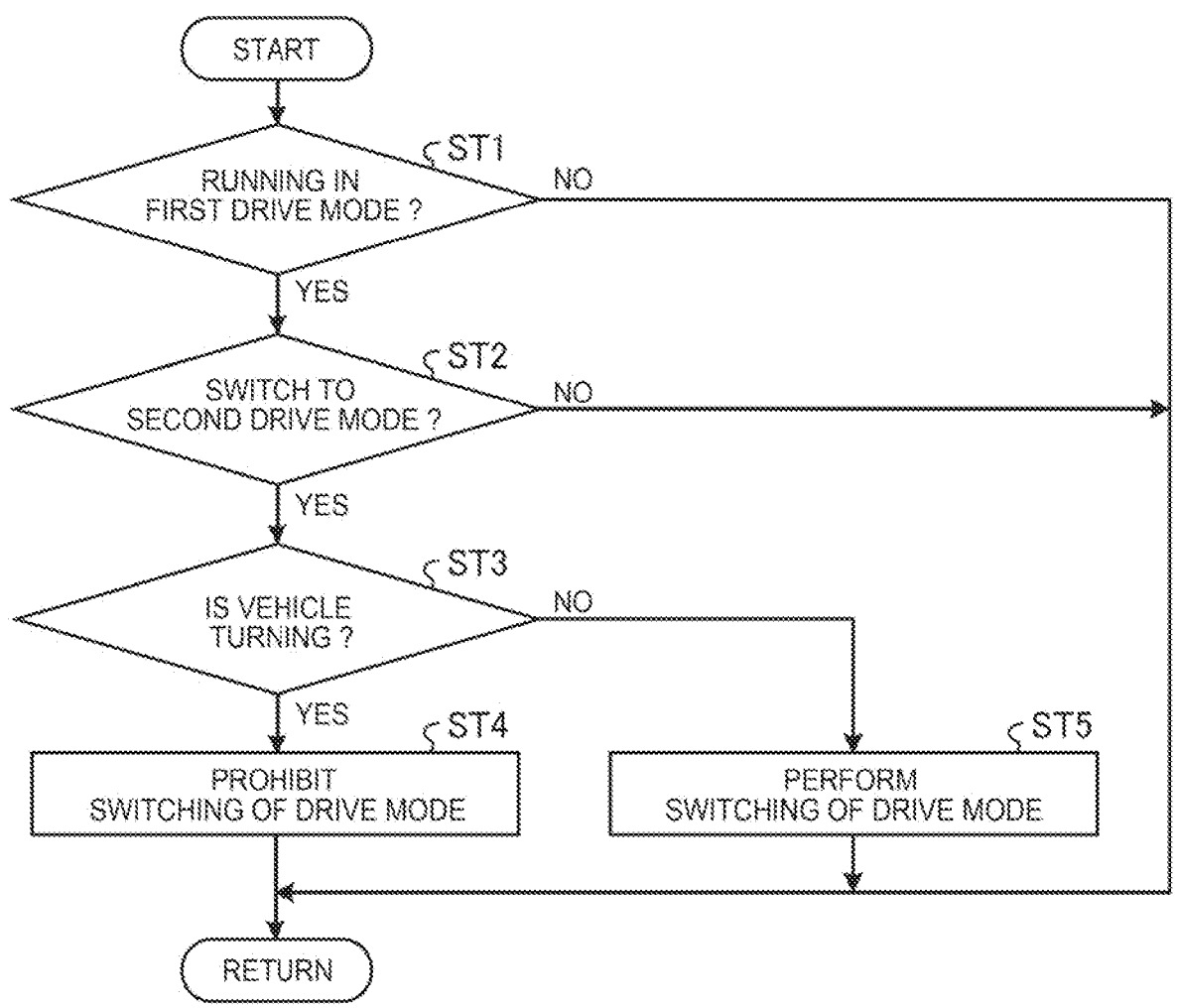
FIG. 15 is a flowchart showing a first example of control to switch a drive mode from a first drive mode to a second drive mode, which is executed by an electronic control unit according to the first embodiment.

FIG. 15 is a flowchart showing a first example of control to switch the drive mode from the first drive mode to the second drive mode, which is executed by the electronic control unit 100 according to the first embodiment. In control shown in FIG. 15, the first drive mode is a drive mode, such as the H4_torque split mode and the H4_LSD mode, in which the vehicle 1 is caused to run in the four-wheel drive state by using power output from at least the first power source. In control shown in FIG. 15, the second drive mode is a drive mode, such as the EV(FF)_Hi mode and the EV(FF)_Lo mode, in which the vehicle 1 is caused to run in the two-wheel drive state by using power output from the third rotating electrical machine MGF.

Initially, the electronic control unit 100 determines in step ST1 whether the vehicle 1 is running in the first drive mode. When the electronic control unit 100 determines that the vehicle 1 is not running in the first drive mode (No in step ST1), the electronic control unit 100 returns the control. On the other hand, when the electronic control unit 100 determines that the vehicle 1 is running in the first drive mode (Yes in step ST1), the electronic control unit 100 determines in step ST2 whether to switch the drive mode to the second drive mode.

When the electronic control unit 100 determines not to switch the drive mode to the second drive mode (No in step ST2), the electronic control unit 100 returns the control. On the other hand, when the electronic control unit 100 determines to switch the drive mode to the second drive mode (Yes in step ST2), the electronic control unit 100 determines in step ST3 whether the vehicle 1 is turning.

When the electronic control unit 100 determines that the vehicle 1 is turning (Yes in step ST3), the electronic control unit 100 prohibits switching of the drive mode to the second drive mode in step ST4 and returns the control. On the other hand, when the electronic control unit 100 determines that the vehicle 1 is not turning (No in step ST3), the electronic control unit 100 switches the drive mode to the second drive mode in step ST5 and returns the control.

As described above, the electronic control unit 100 prohibits switching of the drive mode from the first drive mode to the second drive mode when the vehicle 1 is turning and switches the drive mode when the vehicle 1 is not turning. Thus, an influence on the behavior of the vehicle resulting from switching of the drive mode from the first drive mode to the second drive mode when the vehicle 1 is turning is reduced.

Figure 16:
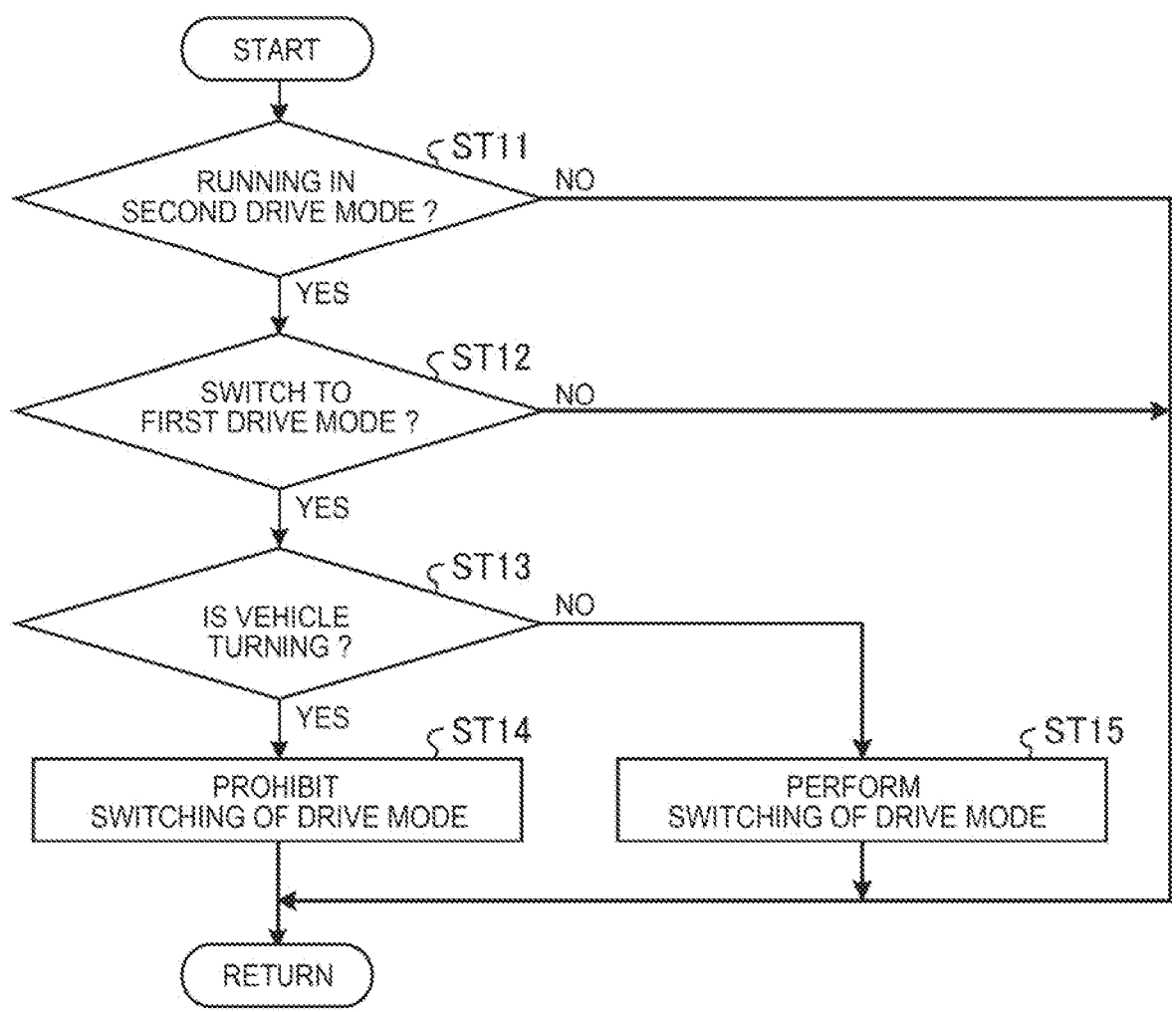
FIG. 16 is a flowchart showing a first example of control to switch the drive mode from the second drive mode to the first drive mode, which is executed by the electronic control unit according to the first embodiment.

FIG. 16 is a flowchart showing a first example of control to switch the drive mode from the second drive mode to the first drive mode, which is executed by the electronic control unit 100 according to the first embodiment. In control shown in FIG. 16, the first drive mode is a drive mode, such as the H4_torque split mode and the H4_LSD mode, in which the vehicle 1 is caused to run in the four-wheel drive state by using power output from at least the first power source. In control shown in FIG. 16, the second drive mode is a drive mode, such as the EV(FF)_Hi mode and the EV(FF)_Lo mode, in which the vehicle 1 is caused to run in the two-wheel drive state by using power output from the third rotating electrical machine MGF.

Initially, the electronic control unit 100 determines in step ST11 whether the vehicle 1 is running in the second drive mode. When the electronic control unit 100 determines that the vehicle 1 is not running in the second drive mode (No in step ST11), the electronic control unit 100 returns the control. On the other hand, when the electronic control unit 100 determines that the vehicle 1 is running in the second drive mode (Yes in step ST11), the electronic control unit 100 determines in step ST12 whether to switch the drive mode to the first drive mode.

When the electronic control unit 100 determines not to switch the drive mode to the first drive mode (No in step ST12), the electronic control unit 100 returns the control. On the other hand, when the electronic control unit 100 determines to switch the drive mode to the first drive mode (Yes in step ST12), the electronic control unit 100 determines in step ST13 whether the vehicle 1 is turning.

When the electronic control unit 100 determines that the vehicle 1 is turning (Yes in step ST13), the electronic control unit 100 prohibits switching of the drive mode to the first drive mode in step ST14 and returns the control. On the other hand, when the electronic control unit 100 determines that the vehicle 1 is not turning (No in step ST13), the electronic control unit 100 switches the drive mode to the first drive mode in step ST15 and returns the control.

As described above, the electronic control unit 100 prohibits switching of the drive mode from the second drive mode to the first drive mode when the vehicle 1 is turning and switches the drive mode when the vehicle 1 is not turning. Thus, an influence on the behavior of the vehicle resulting from switching of the drive mode from the second drive mode to the first drive mode when the vehicle 1 is turning is reduced.

Figure 17:
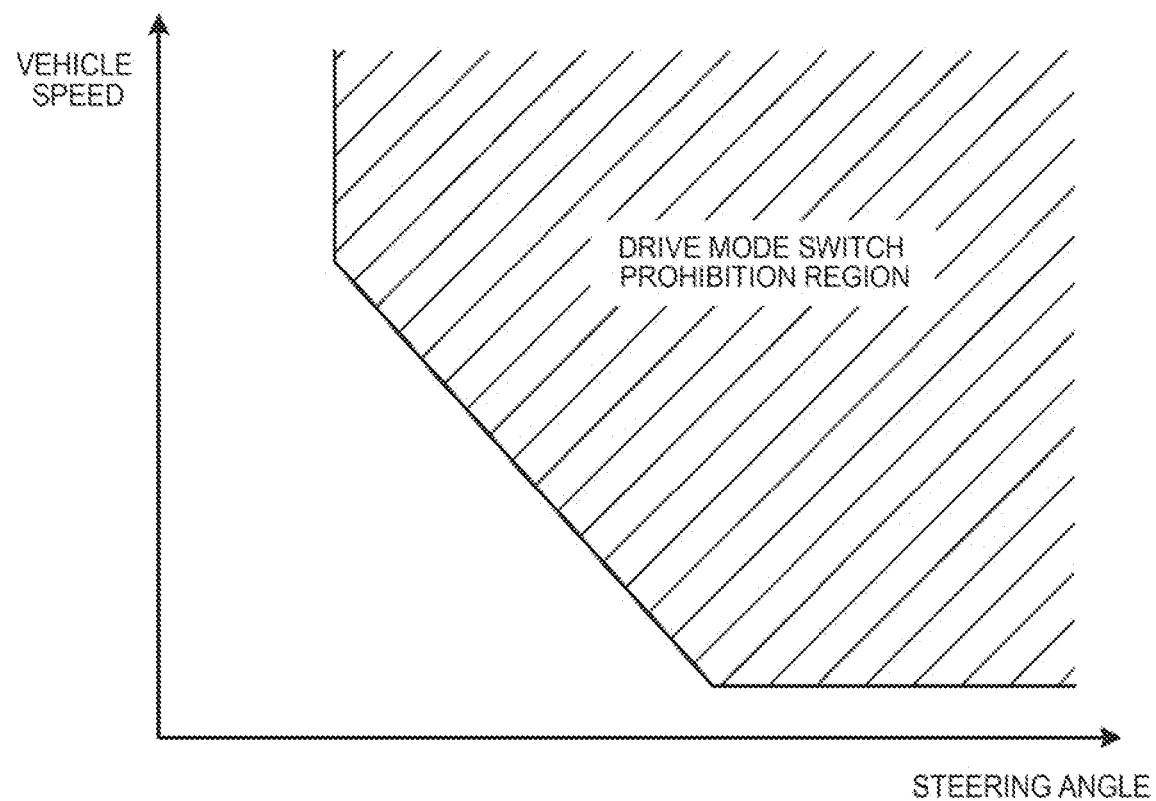
FIG. 17 is a graph showing the relationship between steering angle and vehicle speed used to determine whether to prohibit switching of the drive mode of the vehicle.

FIG. 17 is a graph showing the relationship between steering angle and vehicle speed used to determine whether to prohibit switching of the drive mode. The region indicated by diagonal shaded lines in FIG. 17 is a drive mode switch prohibition region. In the vehicle 1 according to the embodiment, when the steering angle or the vehicle speed of the vehicle 1 is greater than a preset value, for example, when the steering angle and the vehicle speed of the vehicle 1 fall within the preset drive mode switch prohibition region as shown in FIG. 17, the electronic control unit 100 may determine to prohibit switching of the drive mode. Thus, when the vehicle 1 is turning, that is, when the behavior of the vehicle tends to be instable resulting from switching of the drive mode, switching of the drive mode is reduced.

When the vehicle 1 starts turning during switching of the drive mode, and when the state of progress of switching of the drive mode has not reached the predetermined state of progress, the electronic control unit 100 may interrupt switching of the drive mode and return the drive mode to an original drive mode. Thus, even when the vehicle 1 starts turning while switching of the drive mode is being performed, an influence on the behavior of the vehicle resulting from the switching to the drive mode is reduced. The predetermined state of progress is, for example, a state where switching of the second dog clutch D2 is complete. Thus, it is possible to quickly return to an original drive mode.

Figure 18:
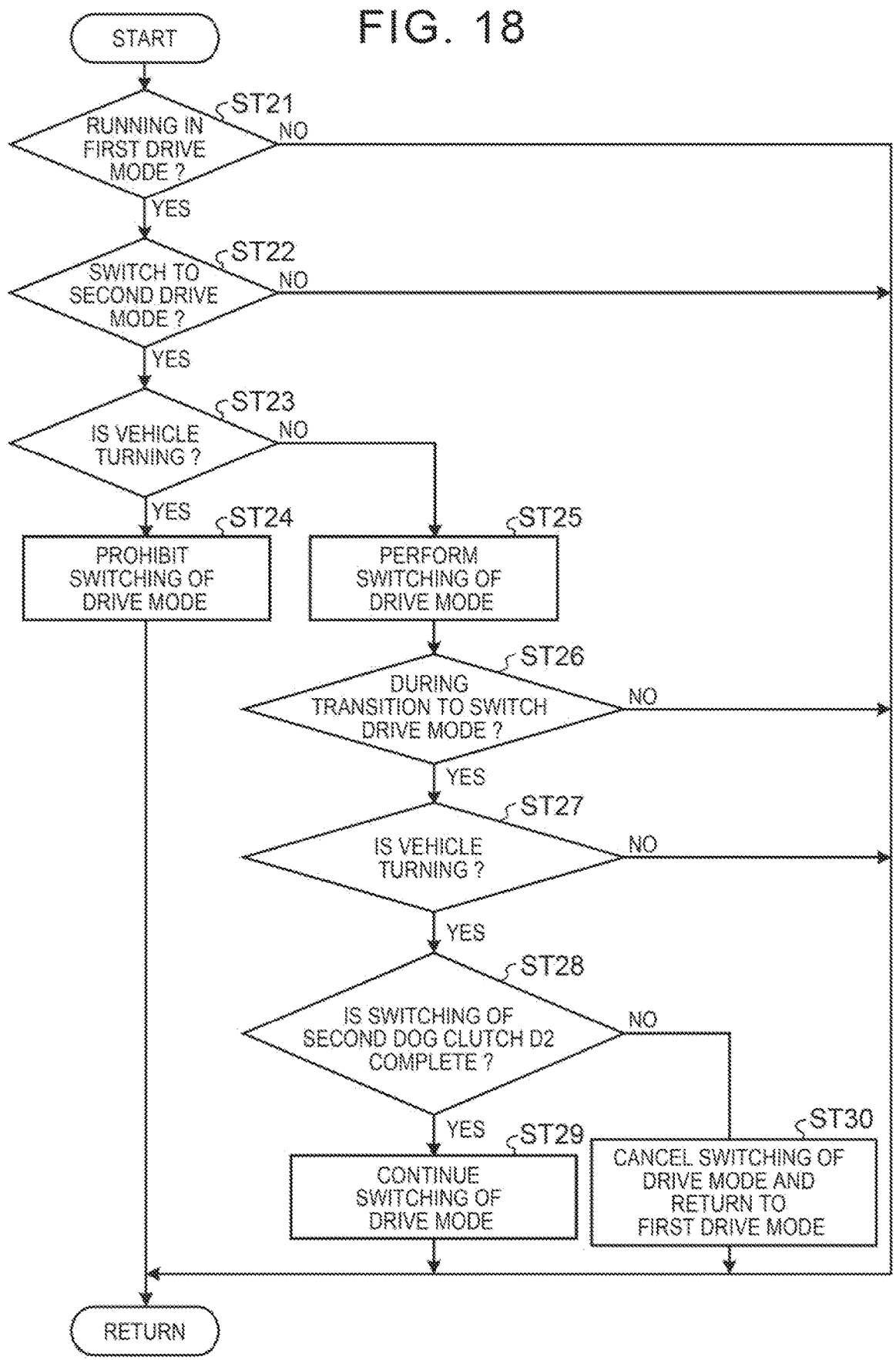
FIG. 18 is a flowchart showing a second example of control to switch the drive mode from the first drive mode to the second drive mode, which is executed by the electronic control unit according to the first embodiment.

FIG. 18 is a flowchart showing a second example of control to switch the drive mode from the first drive mode to the second drive mode, which is executed by the electronic control unit 100 according to the first embodiment. In control shown in FIG. 18, the first drive mode is a drive mode, such as the H4_torque split mode and the H4_LSD mode, in which the vehicle 1 is caused to run in the four-wheel drive state by using power output from at least the first power source. In control shown in FIG. 18, the second drive mode is a drive mode, such as the EV(FF)_Hi mode and the EV(FF)_Lo mode, in which the vehicle 1 is caused to run in the two-wheel drive state by using power output from the third rotating electrical machine MGF.

Initially, the electronic control unit 100 determines in step ST21 whether the vehicle 1 is running in the first drive mode. When the electronic control unit 100 determines that the vehicle 1 is not running in the first drive mode (No in step ST21), the electronic control unit 100 returns the control. On the other hand, when the electronic control unit 100 determines that the vehicle 1 is running in the first drive mode (Yes in step ST21), the electronic control unit 100 determines in step ST22 whether to switch the drive mode to the second drive mode.

When the electronic control unit 100 determines not to switch the drive mode to the second drive mode (No in step ST22), the electronic control unit 100 returns the control. On the other hand, when the electronic control unit 100 determines to switch the drive mode to the second drive mode (Yes in step ST22), the electronic control unit 100 determines in step ST23 whether the vehicle 1 is turning.

When the electronic control unit 100 determines that the vehicle 1 is turning (Yes in step ST23), the electronic control unit 100 prohibits switching of the drive mode to the second drive mode in step ST24 and returns the control. On the other hand, when the electronic control unit 100 determines that the vehicle 1 is not turning (No in step ST23), the electronic control unit 100 switches the drive mode to the second drive mode in step ST25.

Subsequently, the electronic control unit 100 determines in step ST26 whether it is during the transition to switch the drive mode. When the electronic control unit 100 determines that it is not during the transition to switch the drive mode (No in step ST26), the electronic control unit 100 returns the control. On the other hand, when the electronic control unit 100 determines that it is during the transition to switch the drive mode (Yes in step ST26), the electronic control unit 100 determines in step ST27 whether the vehicle 1 is turning. When the electronic control unit 100 determines that the vehicle 1 is not turning (No in step ST27), the electronic control unit 100 returns the control. On the other hand, when the electronic control unit 100 determines that the vehicle 1 is turning (Yes in step ST27), the electronic control unit 100 determines in step ST28 whether switching of the second dog clutch D2 from the connected state to the disconnected state is complete.

When the electronic control unit 100 determines that switching of the second dog clutch D2 from the connected state to the disconnected state is complete (Yes in step ST28), the electronic control unit 100 continues switching of the drive mode to the second drive mode in step ST29 and returns the control. On the other hand, when the electronic control unit 100 determines that switching of the second dog clutch D2 from the connected state to the disconnected state is not complete (No in step ST28), the electronic control unit 100 cancels switching of the drive mode to the first drive mode in step ST30 and returns the control.

As described above, when the vehicle 1 starts turning while switching the drive mode from the first drive mode to the second dog clutch or when the state of progress of switching of the drive mode has not reached the predetermined state of progress, that is, for example, when switching of the second dog clutch D2 from the connected state to the disconnected state is not complete, the electronic control unit 100 interrupts switching of the drive mode from the first drive mode to the second drive mode and returns to the first drive mode that is the original drive mode. Thus, even when the vehicle 1 starts turning while switching of the drive mode from the first drive mode to the second drive mode is being performed, an influence on the behavior of the vehicle resulting from switching to the second drive mode is reduced.

Figure 19:
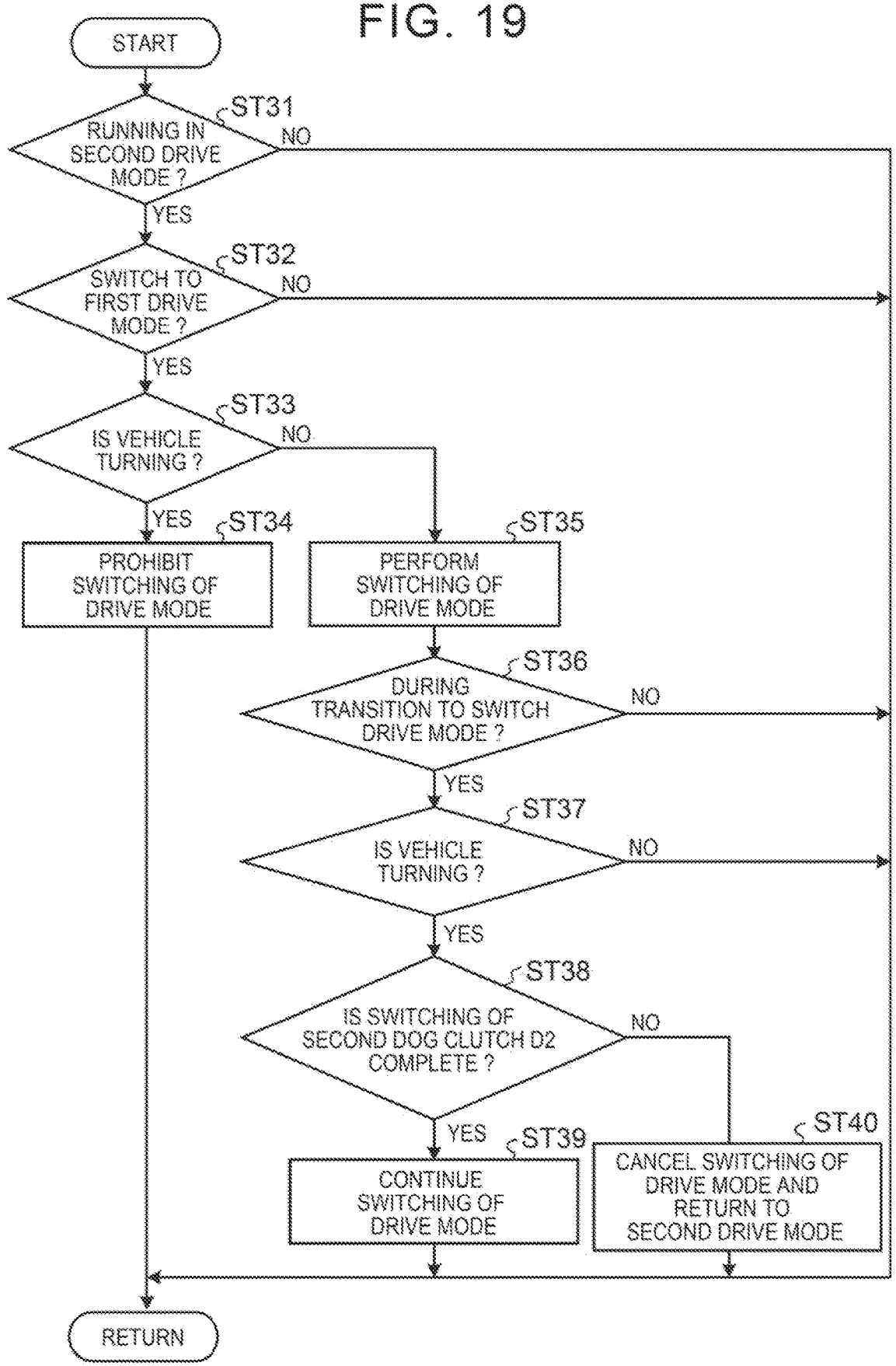
FIG. 19 is a flowchart showing a second example of control to switch the drive mode from the second drive mode to the first drive mode, which is executed by the electronic control unit according to the first embodiment.

FIG. 19 is a flowchart showing a second example of control to switch the drive mode from the second drive mode to the first drive mode, which is executed by the electronic control unit 100 according to the first embodiment. In control shown in FIG. 19, the first drive mode is a drive mode, such as the H4_torque split mode and the H4_LSD mode, in which the vehicle 1 is caused to run in the four-wheel drive state by using power output from at least the first power source. In control shown in FIG. 19, the second drive mode is a drive mode, such as the EV(FF)_Hi mode and the EV(FF)_Lo mode, in which the vehicle 1 is caused to run in the two-wheel drive state by using power output from the third rotating electrical machine MGF.

Initially, the electronic control unit 100 determines in step ST31 whether the vehicle 1 is running in the second drive mode. When the electronic control unit 100 determines that the vehicle 1 is not running in the second drive mode (No in step ST31), the electronic control unit 100 returns the control. On the other hand, when the electronic control unit 100 determines that the vehicle 1 is running in the second drive mode (Yes in step ST31), the electronic control unit 100 determines in step ST32 whether to switch the drive mode to the first drive mode.

When the electronic control unit 100 determines not to switch the drive mode to the first drive mode (No in step ST32), the electronic control unit 100 returns the control. On the other hand, when the electronic control unit 100 determines to switch the drive mode to the first drive mode (Yes in step ST32), the electronic control unit 100 determines in step ST33 whether the vehicle 1 is turning.

When the electronic control unit 100 determines that the vehicle 1 is turning (Yes in step ST33), the electronic control unit 100 prohibits switching of the drive mode to the first drive mode in step ST34 and returns the control. On the other hand, when the electronic control unit 100 determines that the vehicle 1 is not turning (No in step ST33), the electronic control unit 100 switches the drive mode to the first drive mode in step ST35.

Subsequently, the electronic control unit 100 determines in step ST36 whether it is during the transition to switch the drive mode. When the electronic control unit 100 determines that it is not during the transition to switch the drive mode (No in step ST36), the electronic control unit 100 returns the control. On the other hand, when the electronic control unit 100 determines that it is during the transition to switch the drive mode (Yes in step ST36), the electronic control unit 100 determines in step ST37 whether the vehicle 1 is turning. When the electronic control unit 100 determines that the vehicle 1 is not turning (No in step ST37), the electronic control unit 100 returns the control. On the other hand, when the electronic control unit 100 determines that the vehicle 1 is turning (Yes in step ST37), the electronic control unit 100 determines in step ST38 whether switching of the second dog clutch D2 from the connected state to the disconnected state is complete.

When the electronic control unit 100 determines that switching of the second dog clutch D2 from the disconnected state to the connected state is complete (Yes in step ST38), the electronic control unit 100 continues switching of the drive mode to the first drive mode in step ST39 and returns the control. On the other hand, when the electronic control unit 100 determines that switching of the second dog clutch D2 from the disconnected state to the connected state is not complete (No in step ST38), the electronic control unit 100 cancels switching of the drive mode to the first drive mode and returns the drive mode to the second drive mode in step ST40 and returns the control.

As described above, when the vehicle 1 starts turning while switching the drive mode from the second drive mode to the first drive mode or when the state of progress of switching of the drive mode has not reached the predetermined state of progress, that is, for example, when switching of the second dog clutch D2 from the disconnected state to the connected state is not complete, the electronic control unit 100 interrupts switching of the drive mode from the second drive mode to the first drive mode and returns to the second drive mode that is the original drive mode. Thus, even when the vehicle 1 starts turning while switching of the drive mode from the second drive mode to the first drive mode is being performed, an influence on the behavior of the vehicle resulting from switching to the first drive mode is reduced.

Second Embodiment

Next, the vehicle 1 including the drive system 10 according to a second embodiment will be described. In the description of the second embodiment, like reference signs denote similar components to those of the first embodiment, and the description will not be repeated as needed.

Figure 20:
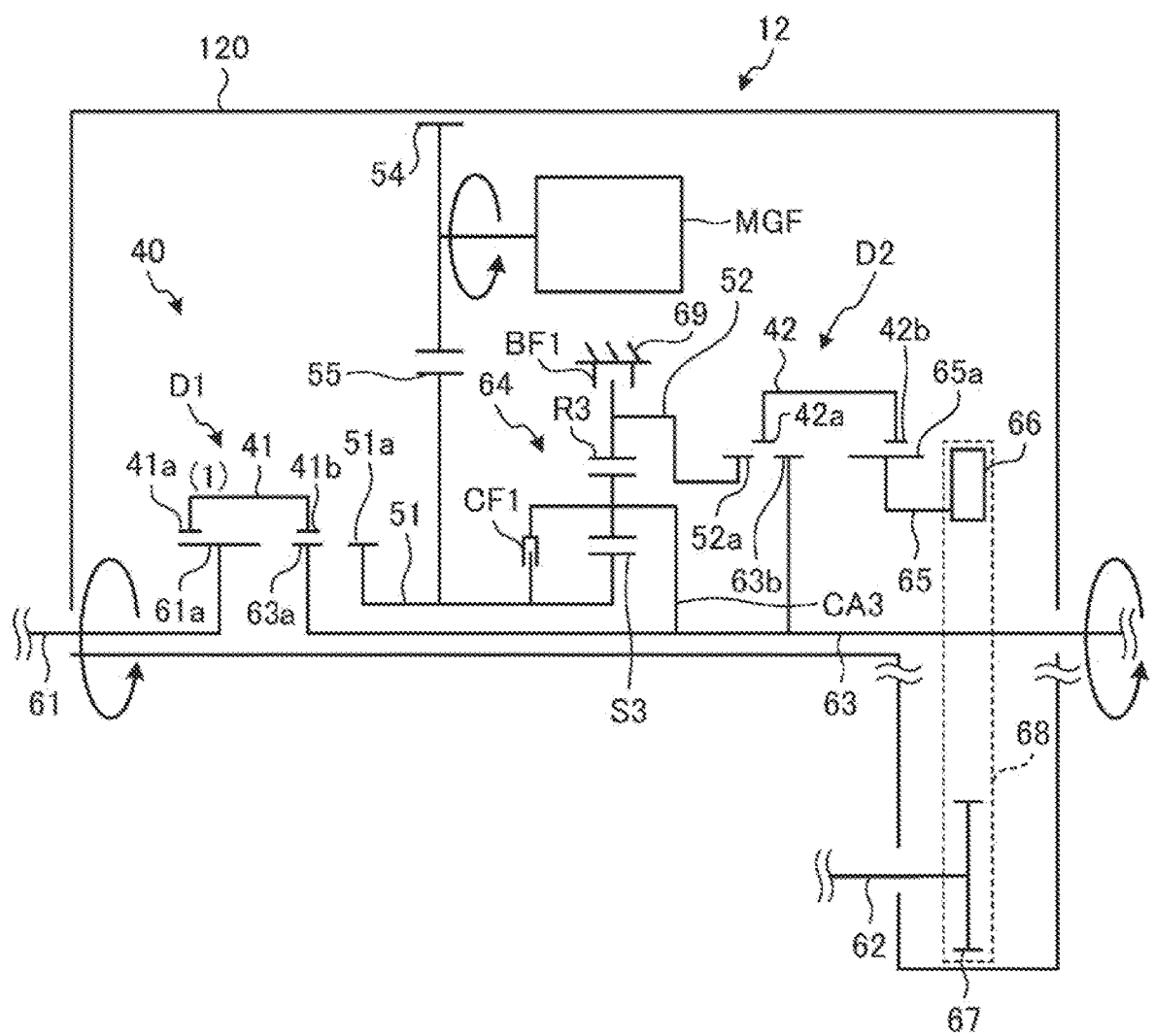
FIG. 20 is a skeletal view schematically showing a transfer according to a second embodiment of the disclosure and is a skeletal view showing a case where the transfer is in a first drive state.

FIG. 20 is a skeletal view schematically showing the transfer 12 according to the second embodiment and is a skeletal view showing a case where the transfer 12 is in a first drive state. In the transfer 12 of the second embodiment, the carrier CA3 of the third planetary gear train 64 is constantly coupled to the rear wheel output shaft 63 so as to integrally rotate with the rear wheel output shaft 63.

The transfer 12 includes the connection switching device 40 (the first dog clutch D1 and the second dog clutch D2), the clutch CF1, and the brake BF1.

The transfer 12 of the second embodiment includes the transmission member 65 that functions as an input rotating member for power to the front wheel 3 side as a rotating member that establishes a front wheel 3-side driveline. The transmission member 65 is coupled to the drive gear 66 so as to integrally rotate with the drive gear 66. The transmission member 65 is a rotating member that transmits power to the front wheel output shaft 62. The transmission member 65 and the drive gear 66 are disposed so as to be rotatable relative to the rear wheel output shaft 63. In the transfer 12 of the second embodiment, the transmission member 65, the drive gear 66, and the third planetary gear train 64 are disposed in the same rotation center as the rear wheel output shaft 63.

The second dog clutch D2 is a second connect-disconnect mechanism that switches a destination to which the transmission member 65 is connected. The second dog clutch D2 is able to selectively couple the transmission member 65 to the rear wheel output shaft 63 or the second rotating member 52 (ring gear R3).

The second dog clutch D2 includes the second switching sleeve 42 serving as a switching member. The second switching sleeve 42 has the first gear teeth 42*a* capable of meshing with the gear teeth 52*a* of the second rotating member 52 that integrally rotates with the ring gear R3 or the second gear teeth 63*b* of the rear wheel output shaft 63. The second switching sleeve 42 has the second gear teeth 42*b* that constantly mesh with the gear teeth 65*a* of the transmission member 65. The second switching sleeve 42 moves in the axial direction by the actuator of the second dog clutch D2. The second switching sleeve 42 switches among a first transmission state in which, in a state where the second gear teeth 42*b* are constantly in mesh with the gear teeth 65*a* of the transmission member 65, the first gear teeth 42*a* mesh with the gear teeth 52*a* of the second rotating member 52, a released state in which the first gear teeth 42*a* do not mesh with any of the gear teeth 52*a* of the second rotating member 52 and the second gear teeth 63*b* of the rear wheel output shaft 63, and a second transmission state in which the first gear teeth 42a are in mesh with the second gear teeth 63b of the rear wheel output shaft 63.

The clutch CF1 selectively connects the sun gear S3 with the carrier CA3 in the third planetary gear train 64. The brake BF1 selectively fixes the ring gear R3 of the third planetary gear train 64 to the fixing member 69. The transfer 12 is set to a high-speed shift stage Hi when the brake BF1 is released and is set to a low-speed shift stage Lo when the brake BF1 is engaged.

Figure 21:
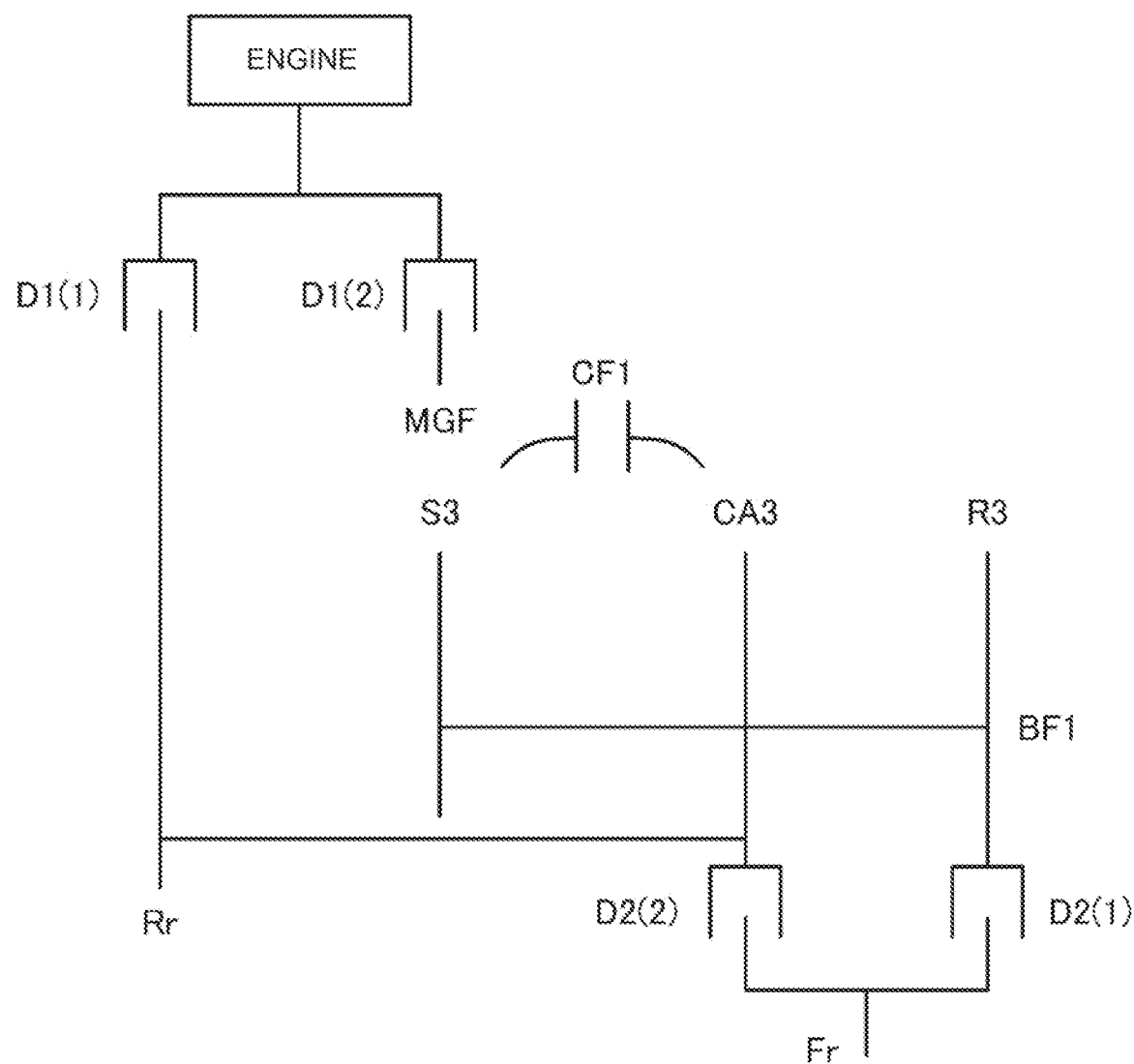
FIG. 21 is a view showing an engagement relationship among rotating members in the transfer according to the second embodiment.

FIG. 21 is a diagram showing an engagement relationship among the rotating members in the transfer 12 according to the second embodiment. The transfer 12 of the second embodiment is connected to the engine 2 or the like serving as the first power source and includes the rear wheel output shaft 63, the front wheel output shaft 62, and the third planetary gear train 64. The rear wheel output shaft 63 is a first output shaft that outputs power to the rear wheels 4 that are one of the pair of front wheels 3 and the pair of rear wheels 4. The front wheel output shaft 62 is a second output shaft that outputs power to the front wheels 3 that are the other one of the pair of front wheels 3 and the pair of rear wheels 4. The third planetary gear train 64 is the differential mechanism including the sun gear S3 that is the first rotating element, the carrier CA3 that is the second rotating element, and the ring gear R3 that is the third rotating element. In the transfer 12 of the second embodiment, the third planetary gear train 64 is configured such that the third rotating electrical machine MGF that is the second power source is connected to the sun gear S3, the rear wheel output shaft 63 that is one of the front wheel output shaft 62 and the rear wheel output shaft 63 is connected to the carrier CA3, and the front wheel output shaft 62 that is the other one of the front wheel output shaft 62 and the rear wheel output shaft 63 is connected to the ring gear R3 so as to be able to be connected to or disconnected from the ring gear R3 by the second dog clutch D2 that is the connect-disconnect mechanism. The third planetary gear train 64 includes the clutch CF1 and the brake BF1. The clutch CF1 is the first engagement element that selectively engages the sun gear S3 with the carrier CA3. The brake BF1 is the second engagement element that selectively fixes the ring gear R3 to the fixing member 69.

FIG. 22 is an operation chart showing the relationship between each drive state and each of the operation statuses of the engagement devices in the transfer 12 according to the second embodiment. In FIG. 22, "ENGAGED" denotes an engaged state, and blank denotes a released state.

The first drive state shown in FIG. 20 is a drive state in an EV(FR)_Hi EV drive mode in which the vehicle 1 is caused to run by using power from the third rotating electrical machine MGF and is a two-wheel drive state in which the power of the third rotating electrical machine MGF is transmitted to only the rear wheels 4. In the first drive state, the transfer 12 is set to the high-speed shift stage Hi. In the first drive state, the step transmission unit 22 of the combined transmission 11 is set to a neutral state.

When the transfer 12 is in the first drive state, the brake BF1 is released, the clutch CF1 is engaged, the first dog clutch D1 is in the first input state, and the second dog clutch D2 is released, as shown in FIG. 22. In FIG. 20, (1) in the first dog clutch D1 denotes that the first dog clutch D1 is in the first input state. In the first drive state, the third planetary gear train 64 is in a direct coupling state in which the sun gear S3 and the carrier CA3 are coupled by the clutch CF1. In the first drive state, when the power of the third rotating electrical machine MGF is transmitted to the rear wheel output shaft 63, the rotation of the third rotating electrical machine MGF is transmitted to the rear wheel output shaft 63 without being shifted in speed in the third planetary gear train 64.

Figure 23:
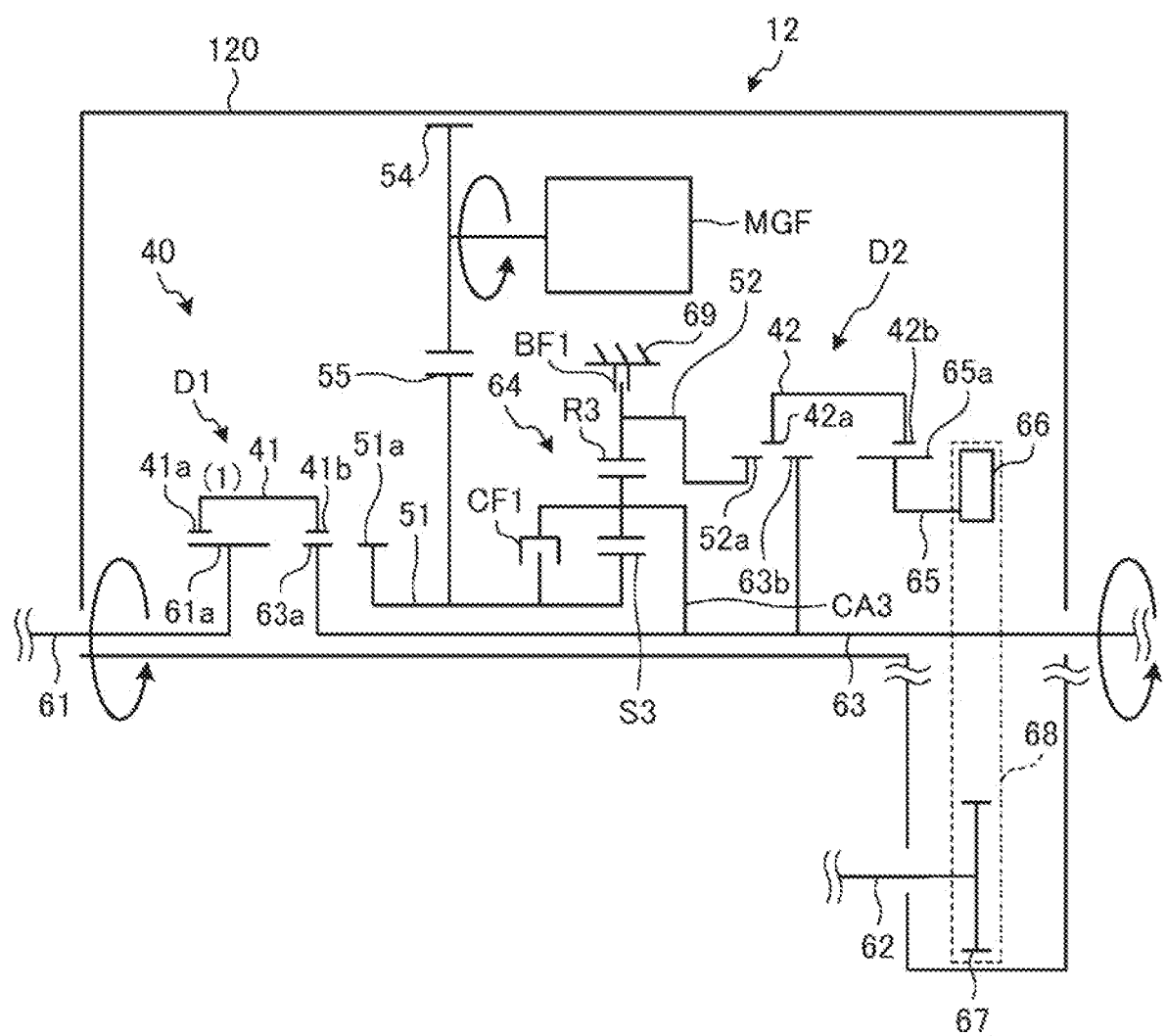
FIG. 23 is a skeletal view showing a case where the transfer according to the second embodiment is in a second drive state.

FIG. 23 is a skeletal view showing a case where the transfer 12 according to the second embodiment is in the second drive state. The second drive state is a drive state in an EV(FR)_Lo EV drive mode in which the vehicle 1 is caused to run by using power from the third rotating electrical machine MGF and is a two-wheel drive state in which the power of the third rotating electrical machine MGF is transmitted to only the rear wheels 4. In the second drive state, the transfer 12 is set to the low-speed shift stage Lo. In the second drive state, the step transmission unit 22 of the combined transmission 11 is set to a neutral state.

When the transfer 12 is in the second drive state, the brake BF1 is engaged, the clutch CF1 is released, the first dog clutch D1 is in the first input state, and the second dog clutch D2 is released, as shown in FIG. 22. In FIG. 23, (1) in the first dog clutch D1 denotes that the first dog clutch D1 is in the first input state. In the second drive state, the third planetary gear train 64 is in a speed reduction state in which the ring gear R3 is fixed to the fixing member 69 by the brake BF1. In the second drive state, when the power of the third rotating electrical machine MGF is transmitted to the rear wheel output shaft 63, the rotation of the third rotating electrical machine MGF is reduced in speed in the third planetary gear train 64 and then transmitted to the rear wheel output shaft 63.

Figure 24:
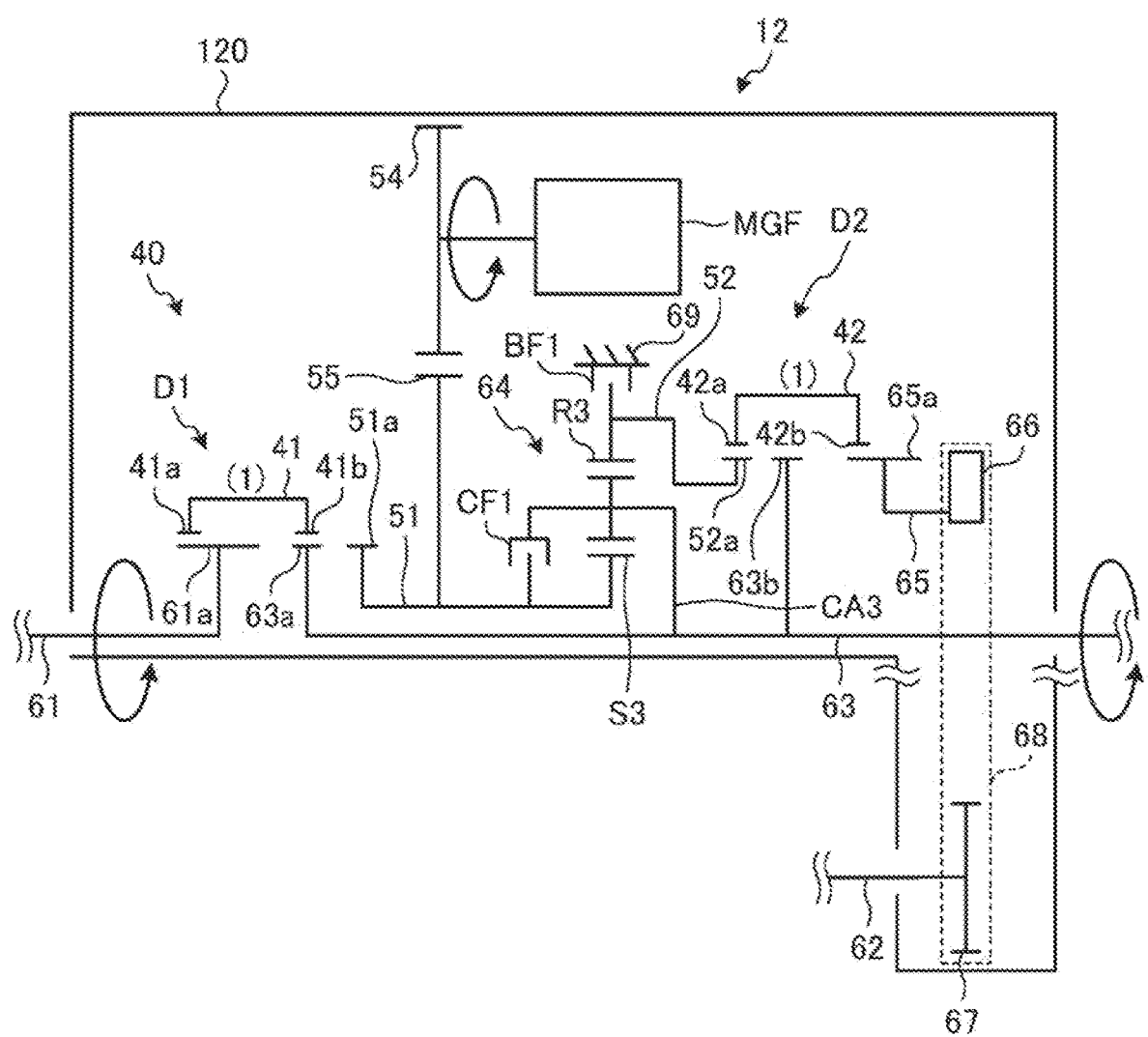
FIG. 24 is a skeletal view showing a case where the transfer according to the second embodiment is in a third drive state.

FIG. 24 is a skeletal view showing a case where the transfer 12 according to the second embodiment is in the third drive state. The third drive state is a drive state in an H4_torque split mode in which the vehicle 1 is caused to run while power transmitted to the transfer 12 is distributed to the front wheel 3 side and the rear wheel 4 side and is a four-wheel drive state in which power is transmitted to the front wheels 3 and the rear wheels 4. In the third drive state, a torque distribution ratio to distribute torque from the input shaft 61 between the front wheel output shaft 62 and the rear wheel output shaft 63 is changed by the MGF torque of the third rotating electrical machine MGF. In other words, the sun gear S3 of the third planetary gear train 64 bears torque transmitted from the rear wheel output shaft 63 to the ring gear R3 of the third planetary gear train 64 by using the MGF torque of the third rotating electrical machine MGF as a reaction force. Thus, the torque transmitted to the ring gear R3 is distributed to the front wheel 3 side and the rear wheel 4 side at a selected ratio. In the third drive state, the transfer 12 is set to the high-speed shift stage Hi.

When the transfer 12 is in the third drive state, the brake BF1 is released, the clutch CF1 is released, the first dog clutch D1 is in the first input state, and the second dog clutch D2 is in the first transmission state, as shown in FIG. 22. In FIG. 24, (1) in the first dog clutch D1 denotes that the first dog clutch D1 is in the first input state. In FIG. 24, (1) in the second dog clutch D2 denotes that the second dog clutch D2 is in the first transmission state.

Figure 25:
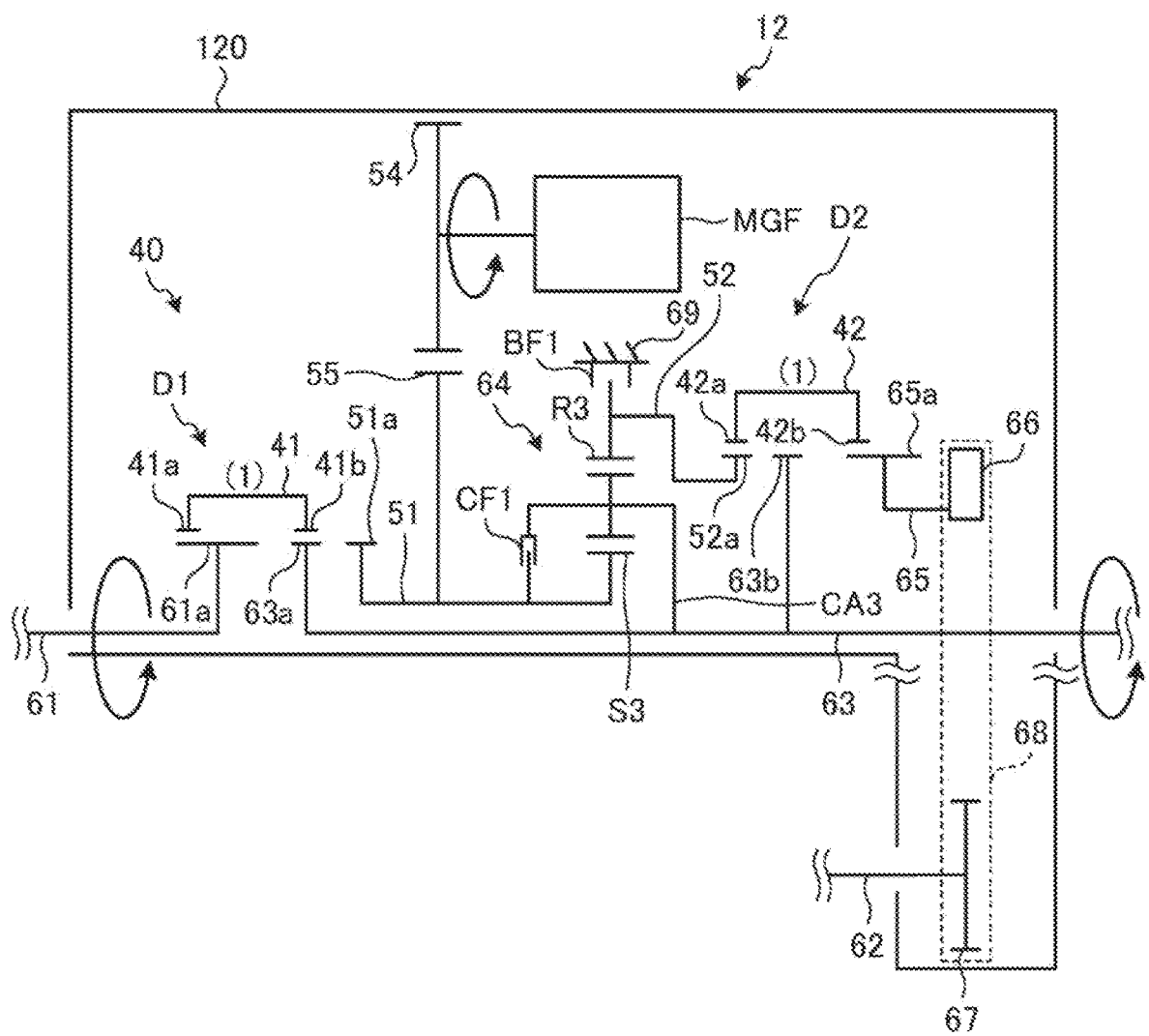
FIG. 25 is a skeletal view showing a case where the transfer according to the second embodiment is in a fourth drive state.

FIG. 25 is a skeletal view showing a case where the transfer 12 according to the second embodiment is in the fourth drive state. The fourth drive state is a drive state in an H4_LSD mode in which the vehicle 1 is caused to run while power transmitted to the transfer 12 is distributed to the front wheel 3 side and the rear wheel 4 side and is a four-wheel drive state in which power is transmitted to the front wheels 3 and the rear wheels 4. The fourth drive state is a drive state in which differential rotation between the front wheel output shaft 62 and the rear wheel output shaft 63 is restricted by engagement control over the clutch CF1. In the fourth drive state, the torque distribution ratio at which torque from the input shaft 61 is distributed between the front wheel output shaft 62 and the rear wheel output shaft 63 is changed through engagement control over the clutch CF1. In the fourth drive state, the transfer 12 is set to the high-speed shift stage Hi.

When the transfer 12 is in the fourth drive state, the brake BF1 is released, the clutch CF1 is in an engagement control (half engaged) state, the first dog clutch D1 is in the first input state, and the second dog clutch D2 is in the first transmission state, as shown in FIG. 22. In FIG. 25, (1) in the first dog clutch D1 denotes that the first dog clutch D1 is in the first input state. In FIG. 25, (1) in the second dog clutch D2 denotes that the second dog clutch D2 is in the first transmission state.

Figure 26:
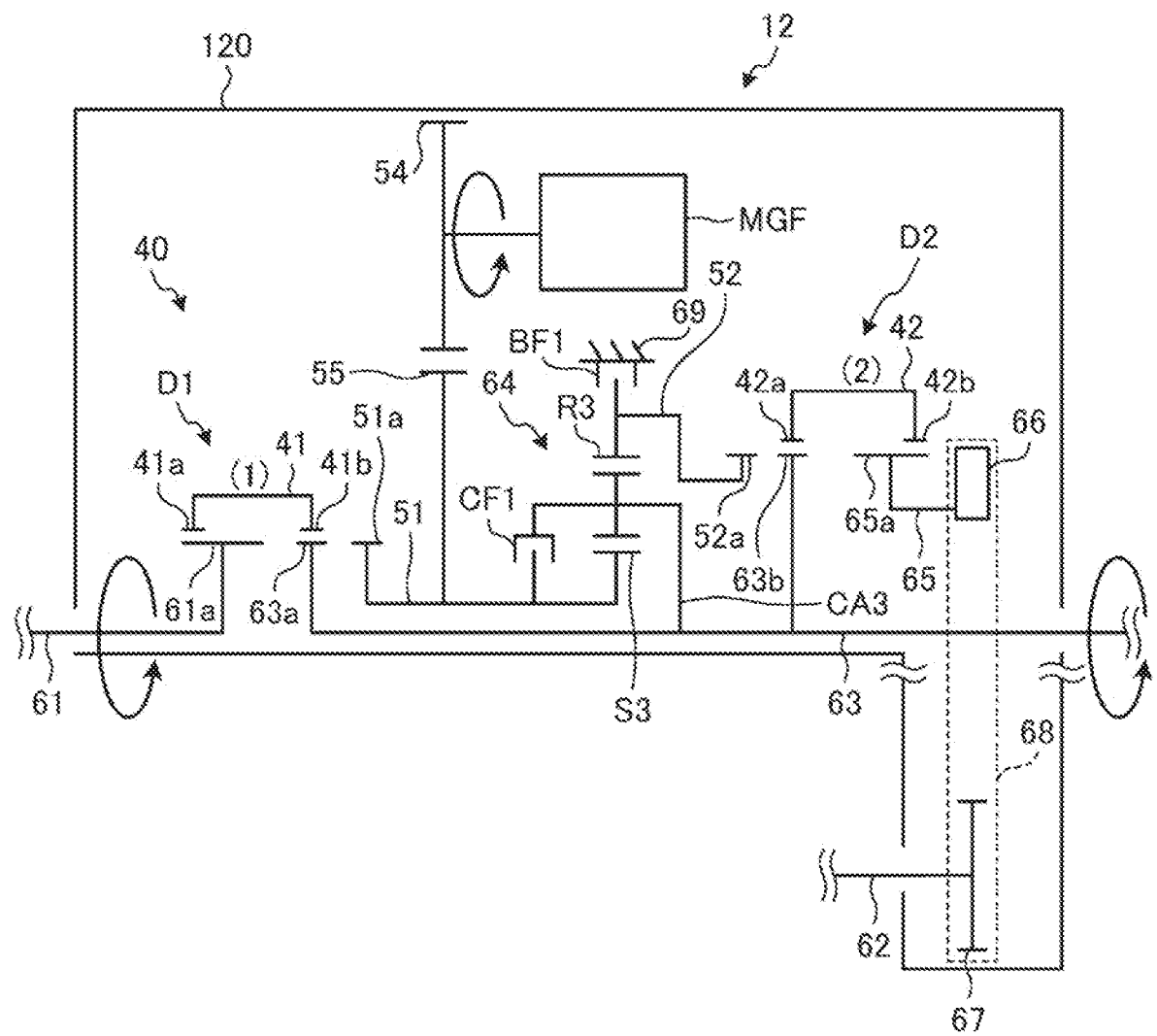
FIG. 26 is a skeletal view showing a case where the transfer according to the second embodiment is in a fifth drive state.

FIG. 26 is a skeletal view showing a case where the transfer 12 according to the second embodiment is in the fifth drive state. The fifth drive state is a drive state in an H4_Lock (fixed distribution 4WD) mode in which the vehicle 1 is caused to run while power transmitted to the transfer 12 is distributed to the front wheel 3 side and the rear wheel 4 side and is a four-wheel drive state in which power is transmitted to the front wheels 3 and the rear wheels 4. The fifth drive state is a drive state in which differential rotation between the front wheel output shaft 62 and the rear wheel output shaft 63 is disabled, and the torque distribution ratio at which torque from the input shaft 61 is distributed between the front wheel output shaft 62 and the rear wheel output shaft 63 is fixed. In the fifth drive state, the transfer 12 is set to the high-speed shift stage Hi. Here, in the fifth drive state, the third rotating electrical machine MGF may be added to the driving power source.

When the transfer 12 is in the fifth drive state, the brake BF1 is released, the clutch CF1 is released, the first dog clutch D1 is in the first input state, and the second dog clutch D2 is in the second transmission state, as shown in FIG. 22. In FIG. 26, (1) in the first dog clutch D1 denotes that the first dog clutch D1 is in the first input state. In FIG. 26, (2) in the second dog clutch D2 denotes that the second dog clutch D2 is in the second transmission state.

Figure 27:
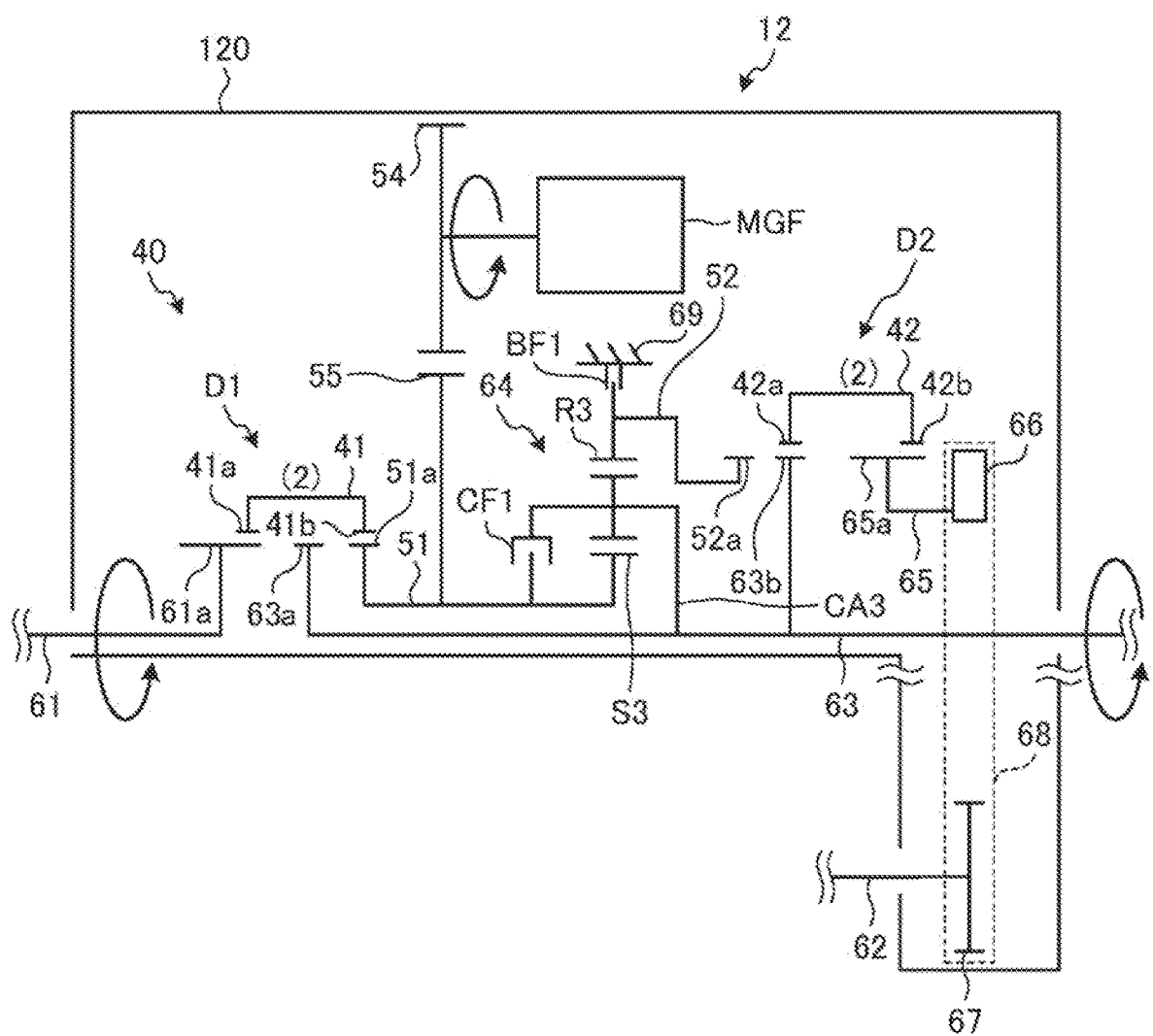
FIG. 27 is a skeletal view showing a case where the transfer according to the second embodiment is in a sixth drive state.

FIG. 27 is a skeletal view showing a case where the transfer 12 according to the second embodiment is in the sixth drive state. The sixth drive state is a drive state in an L4_Lock (fixed distribution 4WD) mode in which the vehicle 1 is caused to run while power transmitted to the transfer 12 is distributed to the front wheel 3 side and the rear wheel 4 side and is a four-wheel drive state in which power is transmitted to the front wheels 3 and the rear wheels 4. The sixth drive state is a drive state in which differential rotation between the front wheel output shaft 62 and the rear wheel output shaft 63 is disabled, and the torque distribution ratio at which torque from the input shaft 61 is distributed between the front wheel output shaft 62 and the rear wheel output shaft 63 is fixed. In the sixth drive state, the transfer 12 is set to the low-speed shift stage Lo. Here, in the sixth drive state, the third rotating electrical machine MGF may be added to the driving power source.

When the transfer 12 is in the sixth drive state, the brake BF1 is engaged, the clutch CF1 is released, the first dog clutch D1 is in the second input state, and the second dog clutch D2 is in the second transmission state, as shown in FIG. 22. In FIG. 27, (2) in the first dog clutch D1 denotes that the first dog clutch D1 is in the second input state. In FIG. 27, (2) in the second dog clutch D2 denotes that the second dog clutch D2 is in the second transmission state.

In the drive system 10 according to the second embodiment, various controls that are executed by the electronic control unit 100 described in the first embodiment with reference to FIG. 15 to FIG. 19, and the like can be executed. In this case, the EV(FF)_Hi mode and the EV(FF)_Lo mode in the first embodiment just need to be replaced with the EV(FR)_Hi mode and the EV(FR)_Lo mode.

For example, in the drive system 10 according to the second embodiment, as in the case of the description with reference to FIG. 15, FIG. 16, and the like in the first embodiment, the electronic control unit 100 prohibits at least one of switching from the first drive mode to the second drive mode and switching from the second drive mode to the first drive mode when the vehicle 1 is turning.

Thus, with the drive system 10 according to the second embodiment, an influence on the behavior of the vehicle resulting from switching of the drive mode when the vehicle 1 is turning is reduced.

For example, in the drive system 10 according to the second embodiment, as in the case of the description with reference to FIG. 18, FIG. 19, and the like in the first embodiment, the electronic control unit 100 may be configured to, when the vehicle 1 starts turning while switching of the drive mode is being performed and when the state of progress of the switching of the drive mode has not reached a predetermined state of progress, that is, for example, when switching of the second dog clutch D2 is not complete, interrupt the switching of the drive mode and return to an original drive mode.

Thus, in the drive system 10 according to the second embodiment, even when the vehicle 1 starts turning while switching of the drive mode is being performed, an influence on the behavior of the vehicle resulting from switching of the drive mode is reduced.

In the first embodiment and the second embodiment, the transfer 12 includes the clutch CF1 and the brake BF1. Alternatively, the transfer 12 may include only any one of the clutch CF1 and the brake BF1.

In the first embodiment and the second embodiment, the transfer 12 includes the first dog clutch D1 to set the L4_Lock mode. Alternatively, when the L4_Lock mode is not configured, the first dog clutch D1 may be omitted. In this case, the input shaft 61 and the rear wheel output shaft 63 may be constantly coupled to each other.

In the first embodiment and the second embodiment, the clutch CF1 is configured to engage the carrier CA3 with the sun gear S3. Alternatively, the clutch CF1 may be configured to engage the carrier CA3 with the ring gear R3 or may engage the sun gear S3 with the ring gear R3.

What is claimed is:

1. A vehicle drive system comprising:
a first power source;
a second power source;
a first output shaft connected to the first power source and configured to output power to one of a pair of front wheels and a pair of rear wheels of a vehicle;
a second output shaft configured to output power to the other one of the pair of front wheels and the pair of rear wheels;
a differential mechanism including a first rotating element, a second rotating element, and a third rotating element; and
an electronic control unit, wherein:
the differential mechanism is configured such that the second power source is connected to the first rotating element, one of the first output shaft and the second output shaft is connected to the second rotating element, and the other one of the first output shaft and the second output shaft is connected to the third rotating element so as to be able to be connected to or disconnected from the third rotating element by a connect-disconnect mechanism;

the differential mechanism includes at least one of a first engagement element configured to selectively engage any two of the first rotating element, the second rotating element, and the third rotating element and a second engagement element configured to selectively engage the third rotating element to a fixing member;

the electronic control unit is configured to, when a first drive mode in which the vehicle is caused to run in a four-wheel drive state by using power output from at least the first power source is set, set the connect-disconnect mechanism to a connected state in which the other one output shaft is connected to the third rotating element;

the electronic control unit is configured to, when a second drive mode in which the vehicle is caused to run in a two-wheel drive state by using power output from the second power source is set, set the connect-disconnect mechanism to a disconnected state in which the other output shaft is disconnected from the third rotating element, and engage the engagement element to integrally rotate the first rotating element, the second rotating element, and the third rotating element or fix the third rotating element to the fixing member; and the electronic control unit is configured to, when the vehicle is turning, prohibit at least one of switching of a drive mode from the first drive mode to the second drive mode and switching of the drive mode from the second drive mode to the first drive mode.

2. The vehicle drive system according to claim 1, wherein the electronic control unit is configured to, when the vehicle starts turning while switching of the at least one drive mode is being performed, and when a state of progress of the switching of the drive mode has not reached a predetermined state of progress, interrupt the switching of the drive mode and return the drive mode to an original drive mode.

3. The vehicle drive system according to claim 2, wherein the predetermined state of progress is a state where switching of the connect-disconnect mechanism is complete.

4. The vehicle drive system according to claim 1, wherein the electronic control unit is configured to, when the vehicle is turning at a steering angle and a vehicle speed of the vehicle respectively greater than preset values, prohibit switching of the at least one drive mode.

5. A control method for a vehicle drive system, the vehicle drive system including a first power source, a second power source, a first output shaft connected to the first power source and configured to output power to one of a pair of front wheels and a pair of rear wheels of a vehicle, a second output shaft configured to output power to the other one of the pair of front wheels and the pair of rear wheels, and a differential mechanism including a first rotating element, a second rotating element, and a third rotating element, the differential mechanism being configured such that the second power source is connected to the first rotating element, one of the first output shaft and the second output shaft is connected to the second rotating element, and the other one of the first output shaft and the second output shaft is connected to the third rotating element so as to be able to be connected to or disconnected from the third rotating element by a connect-disconnect mechanism, and including at least one of a first engagement element configured to selectively engage any two of the first rotating element, the second rotating element, and the third rotating element and a second engagement element configured to selectively engage the third rotating element to a fixing member, the control method comprising:

setting the connect-disconnect mechanism to a connected state in which the other one output shaft is connected to the third rotating element, when a first drive mode in which the vehicle is caused to run in a four-wheel drive state by using power output from at least the first power source is set;

setting the connect-disconnect mechanism to a disconnected state in which the other output shaft is disconnected from the third rotating element, and engaging the engagement element to integrally rotate the first rotating element, the second rotating element, and the third rotating element or fixing the third rotating element to the fixing member, when a second drive mode in which the vehicle is caused to run in a two-wheel drive state by using power output from the second power source is set; and prohibiting at least one of switching of a drive mode from the first drive mode to the second drive mode and switching of the drive mode from the second drive mode to the first drive mode, when the vehicle is turning.

* * * * *